US012560424B2

(12) United States Patent
Barsacchi et al.

(10) Patent No.: US 12,560,424 B2
(45) Date of Patent: Feb. 24, 2026

(54) MACHINE FOR CONTROLLING THE SHAPE OF A REEL OF WEB PRODUCT

(71) Applicant: A.CELLI NONWOVENS S.p.A., Porcari (IT)

(72) Inventors: Fernando Barsacchi, Porcari (IT); Gerry Tambellini, Porcari (IT)

(73) Assignee: A.CELLI NONWOVENS S.P.A., Porcari (IT)

( * ) Notice: Subject to any disclaimer, the term of this patent is extended or adjusted under 35 U.S.C. 154(b) by 175 days.

(21) Appl. No.: 18/556,388

(22) PCT Filed: Apr. 20, 2022

(86) PCT No.: PCT/IB2022/053693
§ 371 (c)(1),
(2) Date: Oct. 20, 2023

(87) PCT Pub. No.: WO2022/224161
PCT Pub. Date: Oct. 27, 2022

(65) Prior Publication Data
US 2024/0191985 A1      Jun. 13, 2024

(30) Foreign Application Priority Data

Apr. 21, 2021      (IT) ........................ 102021000010067

(51) Int. Cl.
*G01B 11/24*          (2006.01)
*B65G 61/00*          (2006.01)
(52) U.S. Cl.
CPC .............. *G01B 11/24* (2013.01); *B65G 61/00* (2013.01)

(58) Field of Classification Search
CPC ........ B65G 61/00; B65H 19/12; B65H 19/30; B65H 23/005; B65H 2301/542; B65H 2511/166; B65H 2515/84; B65H 2553/00; B65H 26/00; B65H 2701/1924; G01B 11/24
USPC ........................................................ 356/601
See application file for complete search history.

(56) References Cited

U.S. PATENT DOCUMENTS

| | | | |
|---|---|---|---|
| 5,513,478 A | 5/1996 | Abt | |
| 6,036,137 A | 3/2000 | Myren | |
| 6,283,402 B1 | 9/2001 | Fordham | |
| 2002/0074087 A1* | 6/2002 | Hashimoto | ........ B65H 19/1868 |
| | | | 156/362 |
| 2005/0156078 A1* | 7/2005 | Ragard | .............. B65H 19/2261 |
| | | | 242/534 |
| 2018/0029735 A1* | 2/2018 | Franzaroli | .............. G01N 21/95 |
| 2019/0270593 A1* | 9/2019 | Pavan | .................... B65G 17/04 |

FOREIGN PATENT DOCUMENTS

| | | | | |
|---|---|---|---|---|
| DE | 10308023 B3 * | 8/2004 | ........... | B65B 25/146 |
| EP | 0915047 A1 | 5/1999 | | |
| WO | 2018054588 A1 | 3/2018 | | |
| WO | 2020079576 A1 | 4/2020 | | |

* cited by examiner

*Primary Examiner* — Tri T Ton
(74) *Attorney, Agent, or Firm* — McGlew and Tuttle, P.C.

(57)          ABSTRACT
Machine for controlling the shape of a reel of web product, comprising a pick-up zone for at least one reel to be evaluated, a moving apparatus of said at least one reel from said pick-up zone to an unloading zone, and an evaluation apparatus of at least the outer diameter of the reel, configured to act between said pick-up zone and said unloading zone.

31 Claims, 10 Drawing Sheets

MACHINE FOR CONTROLLING THE SHAPE OF A REEL OF WEB PRODUCT

TECHNICAL FIELD

The present invention relates to the field of producing continuous thin, or web, products to be wound in a reel, such a paper-based products, paper, tissue paper, nonwovens, films, multi-material laminates and similar products.

In particular, the present invention relates to a machine for controlling the shape of a reel of web product that can be advantageously used in a plant for the optimized production of reels of web products.

Moreover, the subject of the present invention is also a plant for producing reels of thin, or web, products which is provided with such machine.

Background Art

In many industrial sectors there is the need to convert reels of web material, called parent reels (or master rolls), produced, for example, by means of winding on a cylindrical core, into reels of a different size, through a process of unwinding these parent reels and rewinding in reels with different dimensional features by means of machines known as winders or rewinders. The smaller finished sub-reels thus obtained are used as semi-finished products to feed production lines of other articles.

Rewinders generally comprise a station for preparing the supporting cores of the sub-reels, which, for example, have an initial cylindrical body that is cut longitudinally (i.e., in the axial direction of the cylindrical body) into a number of cylindrical cores equal to the number of sub-reels to be produced, each of transverse width (i.e., length along its axis) equal to the width of the sub-reel it will support.

Therefore, the sub-reels are produced side by side with one another. A handler picks up the reels and divides them, i.e. separates them and takes them to a packaging station, where they are labeled, stacked and packaged.

During production of the web product various product defects can occur, which are detected based on geometric features of the reels.

For example, the reels have a different axial width to the width desired, or the cores of the reels are not centered inside said reels and protrude from the flat faces.

Further, the faces of the reels have "ridges" formed by windings of the web not aligned with the core, or single plies protruding from the reel and/or from the core.

Other defects can, for example, concern the truncated cone shape of the reels, i.e., a telescoped appearance thereof, and also a non-parallel configuration of the flat faces of the reels.

These and other "defects", or nonconformities of the reels must be identified in order to be able to grade the quality of the reels, and if necessary to decide whether they must be rejected. Moreover, it is necessary to know these defects in order to take action on the plant and modify any process parameters that cause defects.

SUMMARY

The object of the present invention is to improve the quality of the production of reels of web products, facilitating identification of geometric parameters of the reels that can indicate their parameters of quality.

Another important object of the present invention is to provide a machine for controlling the shape of a reel of web product that is reliable in operation.

Yet another object of the present invention is to provide a machine for controlling the shape of a reel of web product that is suitable for various types and sizes of reels.

Another important object of the present invention is to provide a machine for controlling the shape of a reel of web product that allows improvement of the production quality performances of a plant for producing reels of web products.

One more object of the present invention is to provide a plant for producing reels of web product that allows high quality productions to be obtained.

These and other objects, which will be more apparent below, are achieved with a machine for controlling the shape of a reel of web product, comprising at least one pick-up zone for at least one reel to be evaluated, a moving apparatus of the at least one reel along a moving path from the pick-up zone toward an unloading zone, and an evaluation apparatus for evaluating one or more geometric parameters of the reel, among which, for example, the outer diameter of the reel; this evaluation apparatus is configured to act in at least one evaluation zone provided at least in part along the moving path of the reel.

In general, the reel has a cylindrical structure with two circular flat faces and a central hole, coaxial to the axis of the reel, defined by the cylindrical core on which the web product is wound.

As mentioned, the geometric parameters can concern the measurement of an outer diameter of the reel, or also the measurement of a plurality of outer diameters of the reel, taken according to different angles around the axis of the reel.

The production plant is set up to produce reels of a given outer diameter. By verifying the outer diameter of the reel produced it is possible to verify whether the production process is correctly set up.

By verifying different outer diameters of a same reel (for example two outer diameters orthogonal to each other) it is possible to verify the "roundness", i.e., the circular shape of the flat faces of the reel.

In addition to the outer diameters, the control machine according to the invention can evaluate other geometric parameters, such as the width of the reel, i.e., the width of the reel measured from flat face to flat face, i.e., parallel to the axis of the reel. An axial width value of the reel different to the width desired during production can, for example, be a sign of incorrect positioning of the cutting blade of the web product from a parent reel into smaller webs wound on the reels in question.

Another geometric parameter of the reel that can be evaluated by the control machine according to the invention is the diameter, or several diameters taken according to different angles, of the inner core of the reel on which the web product is wound. Another geometric parameter of the reel that can be evaluated is the depth and/or the amplitude of the annular zone on a face of the reel between core and circumference.

Yet another geometric parameter of the reel that can be evaluated by the control machine according to the invention, can be the non coincidence, on a face of the reel, of the center of the core with the center of the outer circumference of the reel on that face, and can, for example, be evaluated by comparing values of diameters at different angles of a face of the reel and of a face of the core.

Another geometric parameter of the reel that can be evaluated by the control machine according to the invention is the protruding of the core from a flat face of the reel, i.e., the distance between the face of the reel and the end face of the core.

Yet another geometric parameter of the reel that can be evaluated by the control machine according to the invention is the planarity of the two faces of the reel, which, in incorrect shapes, can have a "telescoped", i.e., approximately truncated-cone, shape, of the two faces (one concave and the other convex). This lack of planarity is, for example, given by the value, for example measured on a face of the reel, between the axial distance of an end face of the core and the outer edge of the reel (i.e., the outermost circumference of the reel).

Another geometric parameter of the reel that can be evaluated by the control machine according to the invention is, for example, the inclination of the faces of the reel, i.e., the two flat faces are inclined (i.e., not orthogonal), generally in a more or less parallel manner, with respect to the axis of the reel. This evaluation is given, for example, by the distance between ends of an outer diameter of the reel projected on the axis of the reel.

The lack of planarity of the faces of the reel can also lead to other defects, such as the formation of ridges on the faces (i.e., winding of the reel is irregular forming on the faces annular zones of product that protrude with respect to the flat face of the reel and are equivalently recessed on the opposite face). In this case, another geometric parameter of the reel that can be evaluated by the control machine according to the invention is, for example, the distance, parallel to the axis of the reel, of the edge of the ridge from the relative flat face from which it protrudes.

Similarly to the case of ridges, another geometric parameter of the reel that can be evaluated by the control machine according to the invention concerns any single plies of product protruding from the faces of the reel and, for example, provides for measurement of the distance of the ply from the center of the core.

Analogously to the case of ridges, another geometric parameter of the reel that can be evaluated by the control machine according to the invention concerns the surface roughness of the faces, measured, for example, as axial distance of the edges of the web product wound around the core, measured, for example, along a diametrical line of one face.

Therefore, geometric parameter is meant here as a measurement of a geometric feature of the reel, and can be a distance between points of the reel or between points of the reel and reference zones external to the reel, or measurements of areas, volumes, etc. A geometric parameter can be identified indirectly from the measurement of other geometric parameters measured directly on the reel. For example, the measurement of a distance between two points of a reel can be taken, for example, by directly measuring the distance of these points on the reel, or by measuring the distance of one of the two points of the reel from a reference external to the reel and measuring the distance of the other point with respect to this external reference, and in this way calculating the distance indirectly. Moreover, it is possible to acquire an image of the zone of the reel with the points whose distance is to be identified and calculate the distance directly on the image acquired, by means of an electronic program.

For the purposes of the present invention, detection of given geometric parameters is also meant as the detection of visual defects, such as zones with dirty marks, zones contaminated by other materials, etc. For example, these visual defects are detected by providing a geometric localization of the contaminated zone in the reel.

Therefore, advantageously, according to the invention, the evaluation apparatus of the geometric parameters of the reel of the control machine preferably comprises one or more of the following distance measurement devices adapted to measure the distance, directly or indirectly, of one or more parts of the reel with respect to other parts of the reel or with respect to one or more reference surfaces external to the reel: optical sensors, laser sensors, laser scanning apparatus, ultrasonic apparatus, video cameras, mechanical feelers, and any combinations of devices of this list. Advantageously, these distance measurement devices can be associated with electronic processing programs of the signals detected in order to translate them into geometric parameters of the reel.

In the case of ultrasonic apparatus, in addition to the geometric parameters, physical parameters of the reel, such as stiffness or elastic modulus and internal damping, can also be detected.

In a preferred embodiment, the moving apparatus of the control machine according to the invention comprises at least one pick-up and moving device, adapted to pick up at least one reel from a zone of the moving path and to move it along at least part of this moving path. Preferably, this pick-up and moving device comprises at least part of the evaluation apparatus for evaluating at least one geometric parameter of the reel during pick up and movement.

According to preferred embodiments, the moving apparatus comprises at least one conveyor of reels arranged at least in one row in the conveying direction and wherein an evaluation zone of said geometric parameters by said evaluation apparatus is provided along the path defined by the conveyor.

Conveyor is meant preferably as a moving means for at least one reel in which this reel is supported from below, i.e., is resting thereon, during its movement.

In some embodiments, the machine according to the invention is provided with at least one said pick-up and moving device acting between the pick-up zone and the at least one reel conveyor, and configured to pick up at least one said reel from the pick-up zone and to move it on the conveyor.

In some embodiments, the machine according to the invention is provided with at least one aforesaid pick-up and moving device arranged between the at least one conveyor and the unloading zone, and configured to pick up at least one reel from the conveyor, after it has been evaluated by the evaluation apparatus, and to move it toward the unloading zone.

According to preferred embodiments, the conveyor can be a conveyor belt, for example of the type with chains, on which reels rest, which allows the reels to be moved in a direction of feed, or a roller conveyor system, or a combination of these, for example it can be formed by sections of conveyor belt with respect to one another.

According to various embodiments, two or more conveyors placed side by side can be provided, to move sequences of reels in parallel.

For example, a conveyor has a structure for receiving the reels configured to receive the reels so that their faces are facing upward, for example the conveyor with a conveyor belt defines a supporting surface of the reels so that their axis is arranged vertically.

Both single reels placed one after another and a group of two or more coaxial reels, for example stacked one on top of another, can be arranged on the conveyor.

According to preferred embodiments, the machine comprises at least one magazine of reels arranged at least in a row, on which said pick-up zone is defined.

Advantageously, according to preferred embodiments, the pick-up zone has a structure for receiving the reels configured to receive the reels so that they are supported on the cylindrical sides and not resting on the flat faces, i.e., that have a respective flat face facing in a free direction not facing downward. For example, this structure can be a concave structure, for example a V-shaped structure.

In other preferred embodiments, the pick-up zone can have a structure for receiving the reels configured to receive the reels so that their faces are facing upward, preferably with their reel axis oriented vertically, or configured to receive the reels so that they have a respective flat face facing in a direction of movement of the reel.

According to preferred embodiments, the at least one conveyor can have at least a first and a second section for conveying the at least one reel, in which the reel travels along said sections with two orientations about its axis different to each other, thereby facilitating evaluation of different geometric parameters along different directions of travel. For example, the conveyor can comprise two orthogonal sections of conveyor belts, and in which at least one reel travels along a first section in which a first evaluation of geometric parameters takes place, and is subsequently transferred, orthogonally to the first section, onto the second section, where a second evaluation of geometric parameters takes place.

According to preferred embodiments, an evaluation zone of the geometric parameters by the evaluation apparatus is provided along the conveying path defined by the at least one reel conveyor.

According to some preferred embodiments, this evaluation zone coincides with the pick-up zone by the pick-up and moving device of reels from the pick-up zone to the unloading zone.

According to some preferred embodiments, in the evaluation zone, during the step of detecting the geometric parameters, a relative moving system is present between the reel being evaluated and at least part of said evaluation apparatus. Therefore, there is a relative movement between reel and evaluation apparatus that allows several parts of the reel to be evaluated during the relative movement, increasing the evaluation capacity of the apparatus. For example, the evaluation apparatus is stationary around the conveyor, which moves the reel in the evaluation zone, or, vice versa, once the reel is in the evaluation zone, the evaluation apparatus moves on the reel.

Preferably, this relative moving system is provided with a device for detecting the position of the reel with respect to said at least part of evaluation apparatus. For example, such device for detecting the position of the reel is an encoder system.

According to preferred embodiments, the evaluation apparatus comprises at least one distance sensor (preferably of contactless type, but also of the type with contact, such as a mechanical feeler), preferably an optical sensor or a laser sensor, and wherein during a relative movement of the reel with respect to this at least one distance measurement sensor, this latter is adapted to read the respective distance from the reel in a preferably continuous reading sequence. This configuration comprises a device for detecting the position of the reel, in the direction of relative movement, with respect to the distance sensor, such as an encoder device, so that for a distance reading carried out by a distance sensor the relative position of the reel in said direction of movement (in the case of the encoder, the distance measured in the encoder) is also known, and therefore the combination of the distance information acquired by the sensor from the reel and of the information relating to the position of the reel in the direction of movement allows information on the geometry of the reel to be obtained.

Preferably, the evaluation apparatus comprises a regulation device for regulating the position of the at least one distance measurement sensor in the evaluation zone of the reel; in particular, this device for regulating the position of the sensor comprises at least one regulation direction of the position of the sensor preferably parallel to the reading direction of the distance of the sensor from the reel; in this way, it is possible to optimize reading of the distance for reels of different sizes or for different zones of the reel; preferably, the position regulation device of the sensor further comprises a further device for indicating the position of the distance sensor along the regulation direction, such as an encoder system, so that the position of the distance sensor with respect to a reference system is known; preferably, this regulation device is of automatic type, so that it is possible to move the distance sensor in an automatic and spatially controlled manner.

Advantageously, according to preferred embodiments, the reel conveyor, for example a conveyor belt, defines a support height for the reels, and wherein one or more of the following distance sensors are provided along the conveying direction:

at least a first distance sensor located below, or above, said height and placed under, or over, the space that can be occupied by the reel being evaluated and facing upward, or downward, in operation, vertical or inclined with respect to the vertical, preferably two said first sensors being present, one arranged below said height and one arranged above said height, and preferably mutually aligned in the distance measurement direction, at least a second distance sensor located above said height and in a lateral position with respect to the conveying direction of the reel and facing, in operation, a lateral direction toward the space that can be occupied by the reel, preferably at least two second sensors being present, placed in opposite lateral positions with respect to the conveying direction, preferably mutually aligned in the distance measurement direction.

For example, in the case of the distance sensors indicated above, imagining a reel placed with the flat face resting on the conveyor (which defines the support height) and the sensors stationary during measurement (the reel moves with the conveyor), a first lower sensor can, for example, read a line of points, for example continuously, for example in a very short interval of time (for example every millisecond, so that in defining the accuracy of the machine, reading of the points is comparable to a continuous reading), for example along a diametrical line of the reel. This first sensor, in combination with the known movement of the reel given by an encoder system associated with the conveyor, is able to determine the length of an outer diameter of the reel on the lower face, the presence of ridges on the lower face, of any plies, the roughness of the lower face, the diameter of the core, the movement of the core, and in general all the parameters linked to the planarity (or lack of planarity) of the faces of the reel.

The presence of a further first distance sensor located above said height and placed over the space that can be occupied by the reel being evaluated and facing, in operation, downward and preferably vertically aligned with the first lower sensor, makes it possible to obtain the same parameters mentioned above for the upper face of the reel. Moreover, by combining the distances measured by means of the two first sensors above and below the reel, it is possible to calculate the parameter of the axial width of the reel by the difference.

The presence of a second distance sensor, and more preferably an opposite and aligned pair of second sensors located above said height and in lateral position with respect to the conveying direction of the reel and facing each other (as mentioned, preferably aligned), in combination with the encoder of the conveyor that allows the movement of the reel during the measurements of the sensors to be known, makes it possible to obtain information on the length of a plurality of parallel chords passing through the reel, thus defining, among others, parameters of roundness, etc. Naturally, the machine combines all the distance information calculated by the sensors to obtain, indirectly, all the geometric parameters of interest.

In other embodiments, the evaluation apparatus comprises at least one distance measurement device adapted to measure the distance of one or more parts of the reel with respect to other parts of the reel or with respect to one or more reference surfaces external to the reel and configured to act in the moving path from the pick-up zone to unloading zone of the reel. Therefore, the evaluation does not take place along the movement of the reel in the conveyor belt (in this case not present), but during the movement directly from the pick-up zone, preferably provided on a magazine, to the unloading zone. More preferably, this evaluation takes place when the reel is in the pick-up zone, i.e., pick-up and evaluation zone of the reel coincide. In this case, preferably, said distance measurement device is arranged externally to the pick-up and moving device and is oriented to measure parts of the flat face of said reel arranged in the pick-up zone.

Preferably, at least one said distance measurement device is arranged and oriented toward a specific zone of the moving path of the reel from the pick-up zone to the unloading zone; this specific zone of the moving path toward which the distance measurement device is oriented is a zone distinct from the pick-up zone, in order to measure parts of the reel during the movement step by the pick-up and moving device from the pick-up zone to unloading zone.

For example, a first distance measurement device is oriented to evaluate the face of the reel in the pick-up zone and a second distance measurement device is positioned to evaluate the opposite second face (which was previously in "shadow"), once this has been picked up from the pick-up zone and is moved toward the unloading zone. Naturally, also a third measurement device configured to evaluate other parts of the reel can be present. Otherwise, the distance measurement device oriented toward the pick-up zone can be absent and one or more distance measurement devices arranged along the moving path of the reel from the pick-up zone to the unloading zone can be present.

In preferred embodiments, in particular but not exclusively in the case of distance measurement device oriented to measure parts of the flat face of the reel arranged in the pick-up zone or oriented toward a specific zone of the moving path of the reel from the pick-up zone to the unloading zone, the at least one distance measurement device of the control machine comprises a laser scanner adapted to scan part of the reel, preferably the side or a flat face, all or in part, or all of the flat face of the reel, or a video camera, associated with an electronic image processing program, or yet another image projector, adapted to project images on said part of flat face, in combination with a video camera associated with an electronic program adapted to interpret the images projected on said part of reel, in order to reconstruct one or more geometric parameters of said reel.

In preferred embodiments, the machine comprises at least one reel magazine, provided with one or more of the following features:

in said magazine said reels are arranged at least in a row, on which said pick-up zone is defined;

said magazine is configured to move the reels along its extension, preferably toward the pick-up zone, preferably being formed by a conveyor belt on which the reels are supported;

said magazine is configured to receive the reels and wait, with the reels stopped, for the reels to be picked up by a pick-up and moving device and wherein the pick-up zone is defined for each reel by the position it occupies in the magazine;

said magazine has a structure for receiving the reels such that the reels are supported in the magazine resting with a cylindrical side on a supporting surface, i.e., with the axes of the reels horizontal or slightly inclined with respect to the horizontal, i.e., not vertical;

said magazine has a structure for receiving the reels such that the reels are supported in the magazine with the axis of the reels arranged vertically or almost vertically, i.e., wherein at least some of said reels are supported in the magazine with a flat face resting on a supporting surface.

According to preferred embodiments, the moving apparatus comprises a pick-up and moving device in turn comprising a gripping and supporting apparatus for a reel. Preferably, the pick-up and moving device in turn comprises a robot, for example an industrial, for example anthropomorphous, robot provided with a manipulator associated with the gripping and supporting apparatus for a reel.

In preferred embodiments of the machine according to the invention, the gripping and supporting apparatus can be provided with at least part of the evaluation apparatus of geometric parameters of reels, which allows evaluation of the parameters of the reel being held. In this way, the evaluation of geometric parameters of the reel can take place entirely, or in part, during the step of gripping the reel by this gripping and supporting apparatus. For example, all the geometric parameters required by the machine can be evaluated by the evaluation device present on the gripping and supporting apparatus. Alternatively, only a part of these geometric parameters can be evaluated by the evaluation device present on the gripping and supporting apparatus, while the other geometric parameters can be identified by means of the examples of configuration of evaluation apparatus provided in the embodiments already mentioned above, i.e., an evaluation apparatus present in part on said conveyor and/or externally to said conveyor.

According to preferred embodiments, this gripping and supporting apparatus comprises a central hub adapted to be inserted into the core of a reel, preferably provided with core blocking means, for example of expandable type.

Preferably, said hub is formed, for example, by two jaws adapted to be inserted into the core of a reel in a first compact configuration and to be spread apart with respect to each other to be blocked on the inner walls of the core of the reel. Preferably, the relative movement of expansion of the grippers is given, for example, by the combination of a kinematic mechanism and of a movement actuator, for example a pneumatic cylinder.

Preferably, the gripping and supporting apparatus comprises at least one lateral retaining side wall, for example provided with a concave structure with concavity facing a central hub, in order to press the reel from the cylindrical side of the reel toward the hub. This side wall is mounted sliding on a transverse guide, for example orthogonal to the axis of a reel when the hub is inserted into the core of the reel, which allows the controlled sliding thereof, for example by means of a movement actuator.

Preferably, the gripping and supporting apparatus comprises a pusher, which for example comprises a pusher head adapted to act against a flat face of the reel, and to push the reel in a direction of removal from the aforesaid hub. Preferably, said pusher is associated with a reference system of the position of the pusher head in the direction of movement/extraction, for example an encoder system, so that the position of said head along said direction of movement/extraction, i.e., the position of the face of the reel along said direction, i.e., on said hub, is known. Preferably, this pusher can push the reel along the hub, so that it exits from the core, with decoupling of the reel from the gripping apparatus. Preferably, the pusher can compact several reels present on the hub, so that the contiguous faces are in contact with one another. The pusher can also compact the reels before pick-up when the reels are in the pick-up zone, before the hub is inserted into the cores.

As mentioned, in some embodiments, the gripping and supporting apparatus can be provided with at least part of the evaluation apparatus of geometric parameters of reels. For example, this gripping and supporting apparatus provided with a hub has at least one distance measurement device adapted to act along a radius of a flat face of the reel.

For example this at least one distance measurement device is a distance sensor, for example an optical sensor or laser sensor.

Preferably, a distance sensor adapted to be moved along a direction transverse to the axis of a reel when the hub is inserted in the core of the reel is present. For example, a sliding track for the distance sensor and a movement actuator acting on the distance sensor are present. In this way, the sensor makes it possible in practice to evaluate the radius of the reel, or a semi-chord thereof, the radius of the core, any ridges, protruding plies and roughness associated with the flat face of the reel toward which the sensor is facing.

More preferably, at least two distance sensors are present, located on respective sliding tracks and adapted to move along a same line corresponding approximately to the diametrical line of the reel when the hub is inserted into the core of the reel.

According to another aspect, the invention relates to a plant for producing reels of web product comprising
    a first part for producing a plurality of reels of thin product arranged coaxially mutually adjacent, wherein two adjacent reels have respective flat faces in mutual contact,
    a second part for packaging the reels produced in said first part,
and further comprising a said machine for controlling the shape of a reel of web product arranged between the first part and said second part.

For example, the first part of plant comprises a winding station of a plurality of webs on respective adjacent cores to produce an assembly of the same number of coaxial adjacent reels (with axis more or less horizontal) and in contact with the adjacent flat faces. Preferably, a machine for cutting the cores to size, with the width of the webs to be wound equal to the axial length of the cores, is associated with this winding station.

For example, the winding station is also provided with a cutting module of a web coming from a parent reel (of larger width with respect to the width of the single reels produced by the winding station, for example of width more or less equal to the sum of the widths of the reels produced in the station during winding), into webs of width equal to the desired dimensions of the reels to be wound on the respective cores; this cutting module is provided with knives, the transverse position of which with respect to the direction of winding of the web is adjustable.

According to preferred embodiments, the plant comprises a shifting module of the assembly of adjacent and coaxial reels exiting from said first part of plant, configured to shift this assembly of adjacent reels from this first part to a pick-up zone, this latter being configured to receive the adjacent reels so that they have a respective flat face facing a direction for gripping the reel; preferably this assembly of adjacent reels is adapted to be arranged on a magazine as in some preferred embodiments and examples mentioned above, configured to receive the adjacent reels so that they have a respective flat face facing the direction for gripping.

According to preferred embodiments, the second part of plant comprises a stacking module arranged operatively downstream of the control machine, wherein the reels are stacked coaxially according to a horizontal or vertical axis and arranged on supports; a wrapping module of the stacked reels with packaging film is preferably present.

According to another aspect, the invention relates to a packaging station for processing plants of reels of web product (which in practice can be provided in the second part of production plant mentioned above) provided with a packaging module of reels arranged adjacent to one another, preferably at least in part stacked coaxially, and a machine for controlling the shape of a reel according to one or more of the embodiments indicated above, with this control machine positioned functionally upstream of the packaging module, and more preferably upstream of a stacking module of the reels, in turn upstream of the packaging module of the stack of reels.

According to preferred embodiments, the second part of plant comprises a labeling module of the reels, so that the reels exiting from the control machine are labeled and subsequently carried to the stacking module.

According to preferred embodiments, the second part of plant comprises an electronic control center of the plant provided with a database in which tolerance ranges for one or more geometric parameters detected by said control machine are stored, so that when a geometric parameter is detected outside a respective tolerance range, one or more of the following operations is carried out:
    moving the reel on which said at least one geometric parameter outside a respective tolerance range was detected toward a zone for positioning non-conforming reels, or rejecting the reel,
    labeling the reel on which said at least one geometric parameter outside a respective tolerance range was detected as non-conforming,
    modifying the process parameter/features or parameters/features that cause deviation of the parameter from said range.

The information concerning the surface and dimensional qualities of the reels, acquired by means of the control machine according to the invention, can be used to optimize management of the reel selection system.

In fact, if during the packaging step the control machine according to the invention detects that a certain reel does not comply with the production tolerances, the reel can be classified on the basis of the severity of the defect.

The control machine can inform the reel movement system which instead of sending the reel to the stack to which it should be sent, sends it to a zone allocated to reels of inferior quality or to reels that require to be reworked, or to rejected reels, according to the severity of the defect.

Similarly, the reel labeling module can receive information from the control machine according to the invention, and print information regarding nonconformities on the labels.

In the reel production plant, during rewinding the web of product is cut into strips to form rolls of the desired width. As is known, due to the tension to which the belt is subjected during this process and to the mechanical properties of the belt, the width of the strips that are obtained from the cutting process is not the same as the distance between cutting edges of the blades that cut the web into strips. The aim of the positioning process of the cutting blades is to obtain reels of the width complying with the production specifications.

The control machine, by detecting geometric parameters linked to the axial width of the reels, can provide information for any correction of the distance of the blades to form reels of the desired width.

In some cases the blades are positioned by means of an automatic system, in other cases they are positioned manually by the operator. In both cases the control machine can provide information that allow the blades to be set so as to obtain reels of the desired width. In one case the information is transmitted automatically via software, while in the other case the information is communicated in tables to the operator, who will then modify the positions of the blades manually.

Analogous considerations to those indicated above also apply to axial cutting and positioning of the cardboard cores along the winding axis of the rewinder. According to market requirements, the cardboard cores must not protrude beyond the flat surface of the reel, nor must they be too short with respect to the width of the reel. In some cases the axial cutting and positioning operations are carried out by means of automatic systems, while in others this operation is carried out manually by the operators. The control machine is capable of reading the effective width of the reel, the effective width of the cardboard core, and the relative position between these two bodies. Based on the information collected by the control machine, the length of the cut of the cardboard cores and their positioning on the winding shaft can be corrected. It can thus provide accurate information to obtain a high correspondence between the edge of the cores and the flat faces of the reels.

If a cutting assembly, (in longitudinal direction) of the winding machine has a blade that is becoming blunt, usually the end surface of the reel is irregular, i.e., for example, has partially protruding edges. The control machine according to the invention can control this anomaly and inform the operator of the machine of the need to perform maintenance on the cutting tools.

The web of product being wound, in the case of nonwoven, is a material characterized by a high Poisson's ratio value. This means that if a strip of nonwoven is subjected to a variable tension during winding the width of the strip varies greatly. The result is that the flat surface of the reel is not perfectly planar, but is influenced by the variation of width of the reel. In particular, during the rewinding cycle three winding phases can be identified: acceleration, constant speed, deceleration. Due to the inertia of all the rotating members of the machine, the tension of the various strips can vary according to the various winding phases. If these variations in tension occur, the three zones listed above are clearly identifiable on the flat face. Otherwise: the strip wound in the three operating phases of the rewinder has a different width from phase to phase. If the analysis system of the flat face of the reels detects any non planarity caused by a variation of tension of the strips, the system can correct the operating parameters of the winding machine (belt tension, differential speed of a roller with respect to the preceding one) so as to have a surface of the finished reel with greater planarity and a strip with a width within the required tolerances.

Some types of nonwovens are characterized by a high Poisson's ratio between the transverse strain of the web and the strain in the direction of thickness of the web (in practice, when the sheet is compressed it tends to broaden). In a reel, the various turns exert a radial pressure on the innermost turns, and this causes the radial pressure on the webs that form the various turns to be greater on the inner turns with respect to the outermost turns. If the web is characterized by a high Poisson's ratio value, the shape of the reel will be deformed. This defectiveness can be corrected by varying various operating parameters of the winding machine during winding. The parameters that most influence this aspect are: the winding tension and the force that the rider roller exerts against the reel. Benefits are obtained in terms of planarity of the reels by reducing these values as the diameter of the reel increases.

All these feedback activities, based on the information acquired by the control machine according to the invention, contribute to correct setting of the parameters of the rewinder, and can be managed by artificial intelligence algorithms, for example of "machine learning" type.

BRIEF DESCRIPTION OF THE DRAWINGS

The invention will be better understood by following the description and the accompanying drawings, which illustrate non-limiting examples of embodiments of the invention. More in particular, in the drawing.

DETAILED DESCRIPTION OF EMBODIMENTS

Figure 1:
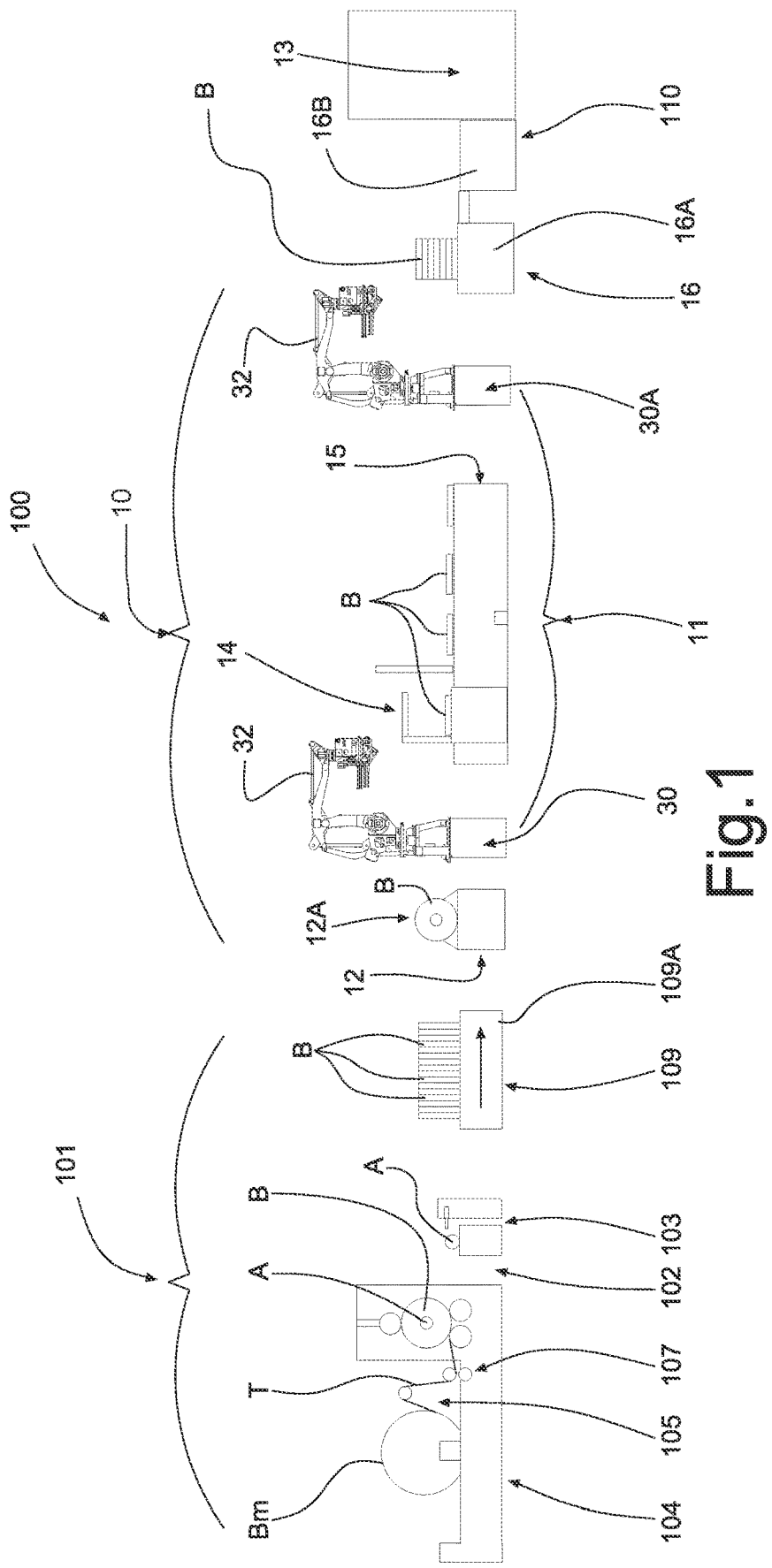
FIG. 1 represents a lateral schematic view of a plant for producing reels according to the invention.

With reference to FIG. 1 mentioned above, a plant for producing reels of web product according to the invention is indicated as a whole with the number 100.

This plant 100 comprises a first part 101 for producing reels B and comprises, for example, a rewinder 102 in which a web of thin product T is processed, for example a non-woven, or carta tissue, or other analogous products (films, laminated products, etc.), coming, for example, from a parent reel Bm produced in another part of the plant.

Figures 2, 3, 4:
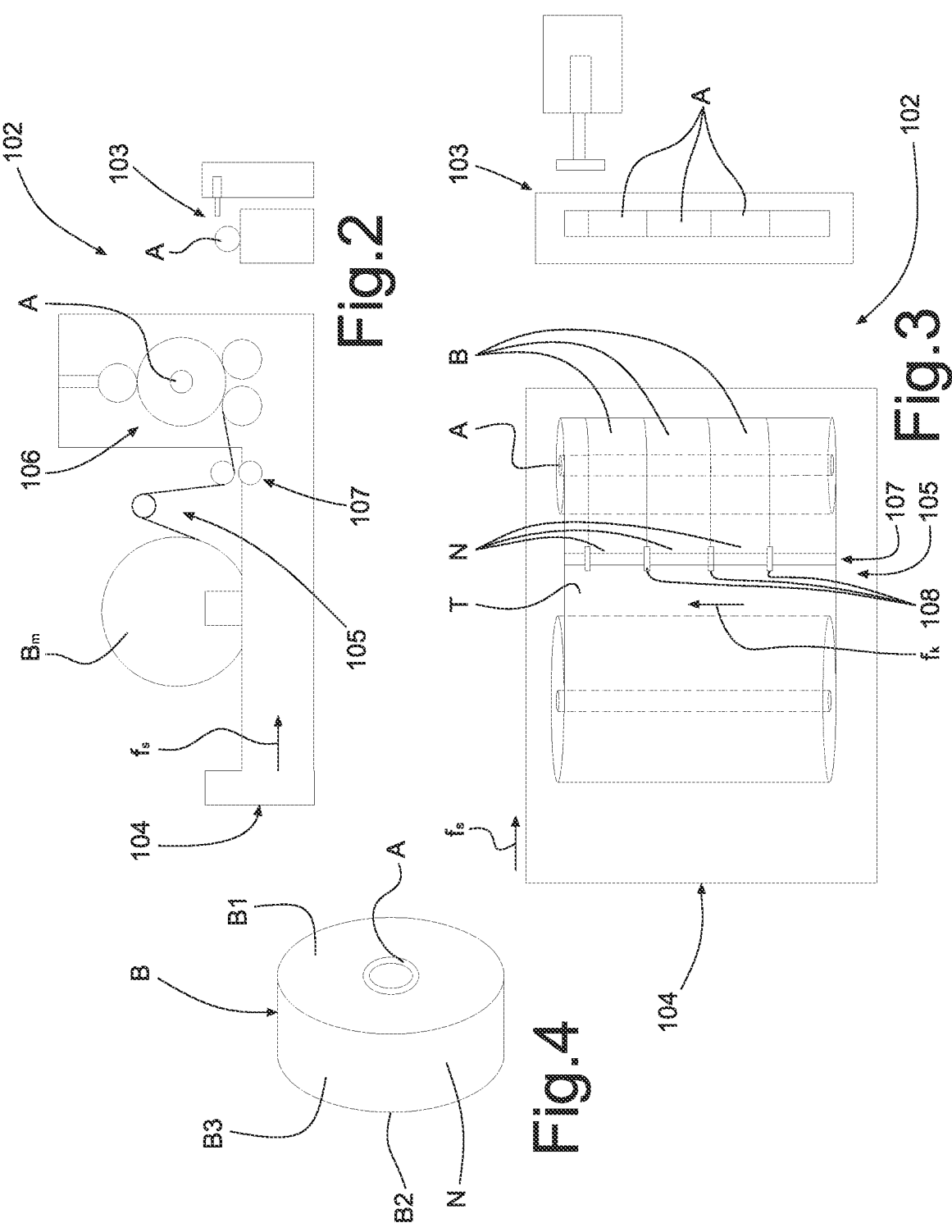
FIG. 2 represents a lateral schematic view of a rewinder of the plant of FIG. 1.
FIG. 3 represents a schematic plan view of a rewinder of the plant of FIG. 1.
FIG. 4 represents a schematic view of a reel.

With particular reference to FIGS. 2 and 3, the rewinder 102 comprises, for example, a station 103 for producing the tubular cylindrical cores A to support the reels B to be formed and a winding station 104 provided with a zone 105 for unwinding the web T of the parent reel Bm to be unwound, a zone 106 for arranging the supporting cores A arranged coaxial and adjacent, in front of the unwinding zone 105, and a cutting module 107, with a plurality of blades 108, arranged between the unwinding zone 105 and the zone 106 for arranging the cores A. Position shifters (not indicated) are associated with the plurality of blades 108 to move the blades according to the direction fk, i.e., crosswise to the unwinding direction fs and regulate the cutting position so as to cut the thin product T into continuous webs N with a transverse width the same as the transverse width of the supporting cores A. In this case, the term "transverse" is meant as a direction orthogonal to the direction of feed fs of the thin product T, i.e., a direction parallel to the axis of rotation of the reels B.

Each reel B has a first circular flat face B1 and a second opposite circular flat face B2, a cylindrical side B3 and tubular cylindrical supporting core A, as shown in FIG. 4.

Therefore, the first part of plant 101 provides for the production of an assembly of reels B of thin product N arranged coaxially mutually adjacent, wherein two adjacent reels have respective flat faces B1-B2 in mutual contact.

A second part of plant 110, for packaging the reels B produced in the first part 101 is provided downstream of the first part of plant 101.

Advantageously, a machine 10 for controlling the shape of a reel B produced in the first part 101 is present between the first part 101 and the second part 110 of the plant 100. According to another point of view, the second part of plant and the control machine 10 in practice form a packaging station of the reels.

For example, the first part of plant 101 is provided with a shifting system 109 for assemblies of adjacent reels exiting from the first part 101, i.e., produced in the rewinder 102, adapted to shift these assemblies in the machine 10. For example, this shifting system can be provided with trolleys 109A (movable on the ground or raised in the air, for example by means of an overhead crane) on each of which an assembly of adjacent reels exiting from the rewinder 102 is arranged, according to known methods, such as a machine that picks up the reels, freeing them from one another, and bundling them in this free manner (one at a time or all together) on a trolley 109A, or yet other types of machines.

The trolleys 109A are moved in the area of the machine 10 and here, by means of the tilters provided on these trolleys, move the assemblies of reels B onto respective magazines 12. On these magazines, the assemblies of reels are in a row, substantially mutually coaxial. A pick-up zone

12A for one or more reels is provided at the head of each magazine, as will be better explained below.

Each magazine 12 can be formed by a moving belt, for example made of motorized support rollers, which allows the reels of an assembly arranged thereon to be moved in a direction of feed toward the pick-up zone 12A.

For example, these magazines 12 have a structure configured to receive the reels B so that they have a respective flat face B1 or B2 facing the direction of movement defined by the roller conveyor belt, i.e., according to the arrow f2. In practice, these reels can have their reel axis parallel to the direction of feed f2 (for example, inclined from bottom to top). For example, the structure of a magazine 12 can be a concave structure, for example a V-shaped structure, with concavity facing upward.

Alternatively, the magazines 12 can be "static", i.e., the reels deposited therein are stopped and not moved toward the pick-up zone 12A. In this case, the reels are picked up, one at a time (the first of the row), by a pick-up and moving device (described below) from the same position in which they were deposited by the shifting system 109. This device always picks up the first reel of the row, up to the last, in a new pick-up zone that coincides with the position of the reel that is located each time at the head of the row. Also in this case, the structure of a magazine 12 can be a concave structure, for example a V-shaped structure, with concavity facing upward.

In general, the machine 10 is provided with a moving apparatus 11 of the reels from the pick-up zone 12A to an unloading zone 13, along a moving path, and an evaluation apparatus 14 of one or more geometric parameters of the reels, among which at least the outer diameter of the reels B, configured to act along this moving path.

Figure 1A:
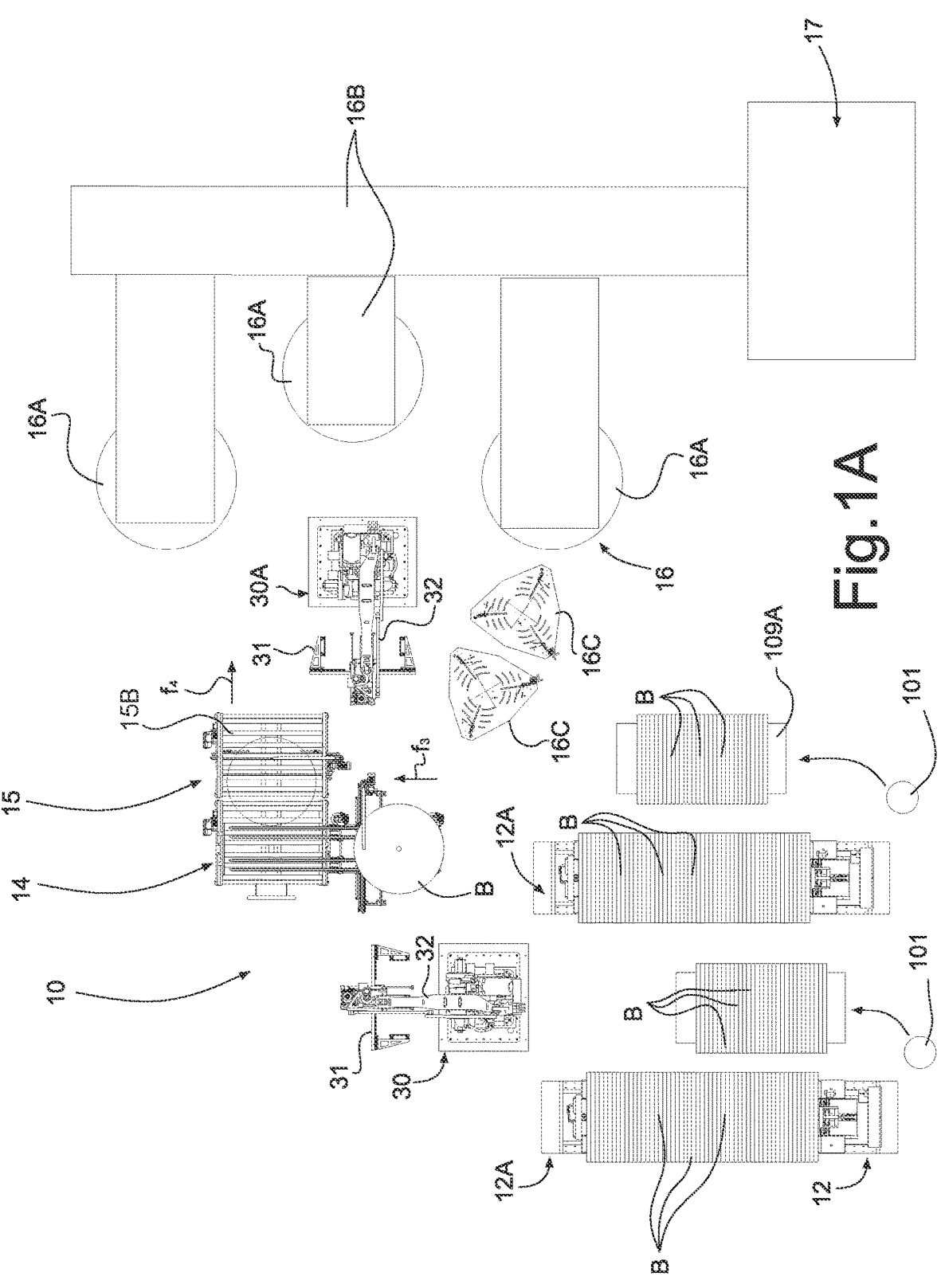
FIG. 1A represents a schematic top view of a plant for producing reels according to the invention.
Figure 5:
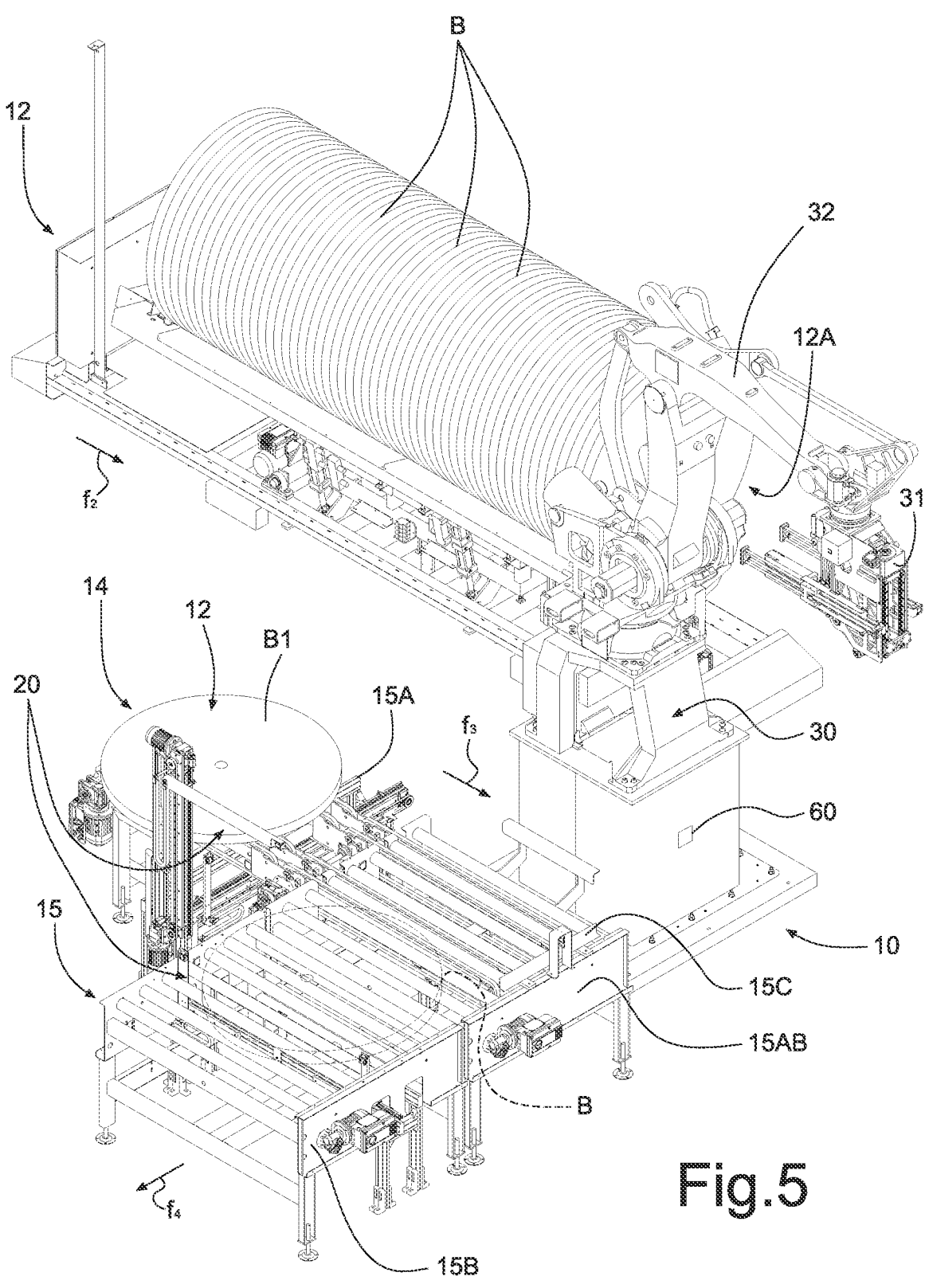
FIG. 5 represents a schematic axonometric view of a first embodiment of control machine according to the invention, in a plant as in FIG. 1.
Figure 6:
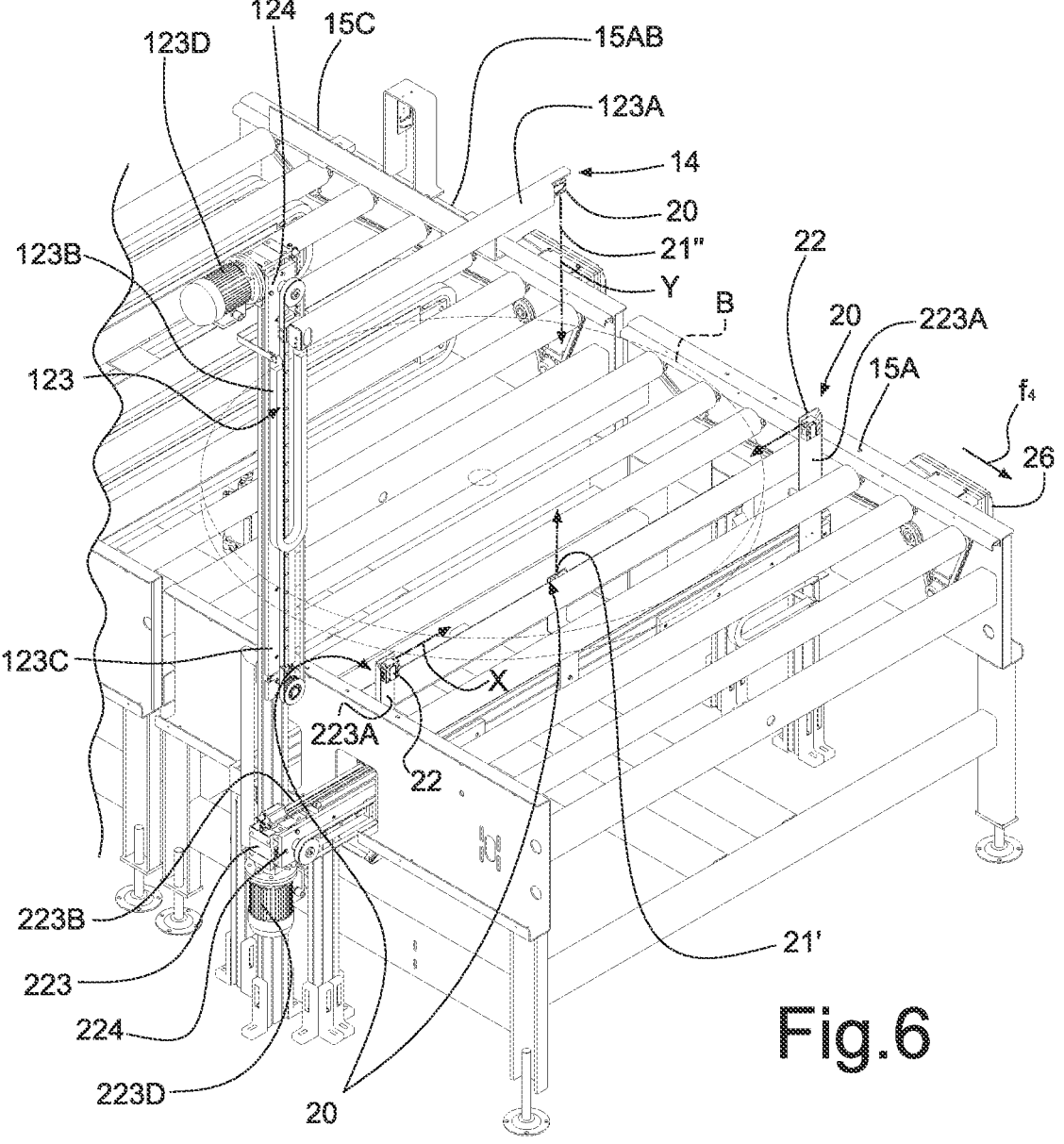
FIG. 6 represents a portion of the machine of FIG. 5.

FIGS. 5 and 6 show a first embodiment of control machine 10, wherein the moving apparatus 11 comprises a conveyor, for example a conveyor belt 15 that moves a sequence of reels B coming from one or more magazines 12 (two magazines 12 are shown in FIG. 1A).

In this example, the conveyor belt 15 defines a supporting surface of the reels B so that they have their axis arranged vertically. In practice, the conveyor has a structure for receiving the reels B configured to receive the reels so that they have the faces B1 or B2 facing upward.

The conveyor belt 15 can be provided with at least a first section 15A and a second section 15B for conveying the reels B, for example orthogonal to each other.

The first section 15A is, for example, produced by a portion of conveyor belt of chain type driven between drive sprockets, which define the supporting surface for the flat faces of the reels, while the second section is, for example, produced by motorized rollers (the movement and extension of the chains is advantageously parallel to the rotation axis of the rollers).

The reels B are positioned on the first section 15A by means of a first pick-up and moving device 30 (better described below), adapted to pick up at least one reel B from the pick-up zone 12A at the head of a magazine 12 and to move it onto the first section 15A. On this first section 15A the reels move according to the arrow f3 (for example, more or less parallel to the ground). When a reel reaches the intersection 15AB with the second section 15B, it is moved in the direction f4 orthogonal to the direction f3.

For example, the chains of the first section 15A are associated with a vertical moving system (not indicated in the figures for the sake of simplicity) so that the supporting surface for the reels defined by these chains can move from above to below the support height defined by the rollers of the second section 15B of conveyor belt. Therefore, when the reel reaches the intersection 15AB, the chains of the first section are lowered, leaving the reel free to be moved by the second section 15B of conveyor belt.

The end of the second section 15B of the conveyor belt 15, defines a handling zone for a second pick-up and moving device 30A, for example analogous to the first pick-up and moving device 30, adapted to pick up a reel from the second section 15B of the conveyor 15 and to move it onto a stacking module 16, provided with respective platforms 16A on which the reels are stacked and subsequently moved, by means of roller handlers 16B toward a wrapping module 17 for wrapping with packaging film, according to known methods. Magazines 16C for cardboard discs to place between the stacked reels, for example handled by the same robot 32, are also present in the packaging zone.

The pick-up and moving device 30 (and optionally 30A) in turn comprises a gripping and supporting apparatus 31 for a reel, better described below.

In these examples, the pick-up and moving device 30 can, for example, be an industrial robot 32, for example of anthropomorphous type (with the gripping and supporting apparatus 31 associated with the manipulator thereof), which picks up the reel B from the pick-up zone 12A and carries it onto the first section 15A of conveyor belt (or from the second section 15B to the stacking module 16, in the case of the second pick-up and moving device 30B).

The evaluation apparatus 14 allows evaluation of geometric parameters of the reels passing between the first production part of plant 101 and the second packaging part of plant 110.

In this example, the evaluation apparatus 14 is arranged along the second section 15B of conveyor belt 15 and is provided with a plurality of distance measurement devices 20, adapted to measure the distance of one or more parts of a reel with respect to the other parts of the reel or with respect to one or more reference surfaces external to the reel.

For example, this plurality of distance measurement devices comprises a pair of first distance sensors 21, for example optical sensors or laser sensors adapted to measure the distance from an object according to one direction, placed over and under the supporting surface of the reel on the conveyor belt, i.e., over and under the support height of the reel on the conveyor belt. A first lower sensor 21' is placed under the support height of the reel on the second section 15B, and a first upper sensor 21" is placed over the support height, and more in particular over the space that can be occupied by the reel.

The two first sensors 21 are advantageously held aligned in the measurement direction (for example, a vertical direction Y).

Two second distance measurement sensors 22 are arranged over the support height of the reel on the conveyor belt 15, and in lateral position with respect to the conveying direction f4 of the reel. These sensors 22 are preferably mutually aligned in the distance measurement direction X (for example horizontally) and facing, in operation, a lateral direction toward the center of the conveyor belt, i.e., the space that can be occupied by the reel.

The evaluation apparatus 14 further comprises, for at least one distance measurement sensor of each pair 21-22, preferably for both, a respective regulation device 123-223 for regulating the position of the respective sensor in the evaluation zone of the reel. Advantageously, each regulation device 123-223 allows the movement of the sensor along a regulation direction, for example by means of a guide system and a movement actuator. The regulation device of the position of the sensor 123-223 further comprises a further device 124-224 for indicating the position of the distance sensor 21-22 along the regulation direction, such as an encoder system, so that the position of the distance sensor with respect to a reference system is known. Advantageously, the regulation device is of automatic type, so that it is possible to move the distance sensor in an automated and spatially controlled manner.

Purely by way of example, an example of a regulation device 123 applied to the first upper distance sensor 21" is described in detail, the regulation devices linked to the other distance sensors listed being similar.

This distance sensor 21" is mounted at the head of a beam 123A positioned projecting in a cantilever fashion over the second section 15B of the conveyor belt, in the evaluation zone of the reel B. This beam 123A is placed sliding on the vertical guide 123B produced on a column 123C placed laterally to the second section of the conveyor belt 15B, and operated in translation by a gear motor 123D, which operates a belt system operatively connected to the beam for its movement. An encoder system, schematized by the number 124, associated with the gear motor and with the guide, makes it possible to know, at all times, the position of the beam and hence of the sensor on the guide and hence its distance from the support height of the reel on the conveyor belt.

The column 123C (configuration not shown in the figures) can be mounted on a carriage sliding on a further guide located under the conveyor belt, and oriented crosswise (preferably orthogonally thereto). Also in this case a motorized moving system with which an encoder is associated allows the column and hence the first upper distance sensor to be moved in the direction crosswise to the direction of feed, in an automated and spatially controlled manner.

To summarize, the first upper sensor 21" can be moved, knowing the position, for example along a regulation direction parallel to the arrow Y and optionally also along a regulation direction parallel to a direction X orthogonal to Y.

Analogously, the second sensors 22 comprise a regulation device 223 for regulating the position of the respective sensor in the evaluation zone of the reel knowing the position, for example along the regulation directions given by the arrow X. They are mounted, for example, on a bracket 223A sliding on a transverse horizontal guide 223B (parallel to f3) located under the support surface for the reel on the second section of conveyor belt 15B, and operated in translation by a gear motor 223D, which operates a belt system operatively connected to the beam for its movement. An encoder system, schematized by the number 224, associated with the gear motor and with the guide, makes it possible to know, at all times, the position of the brackets and hence of the sensors 22 on the guide and hence their mutual distance.

In this way, it is possible to optimize the position of the sensors with respect to the dimensions of the reels, in order to optimize the distance from the reels, i.e., the reading range of the sensors.

In this example, the distance measurement sensors 21-22, during the step of measuring the distances from the reel, are stopped, while the reel moves according to the direction of feed f2, given by the movement of the first section of conveyor belt.

Therefore, there is a relative moving system between the reel being evaluated and at least the part of the evaluation apparatus formed by the distance sensors 21-22. In other embodiments, the relative moving system could provide for the movement of the sensors with respect to the reel, stopped or moved at a lower speed than the sensors (for example the sensors could be mounted on a translating portal).

In order to optimize calculation of the geometric parameters of the reel deriving from the distance measurements detected by the distance sensors 21-22, a device 26 is present for detecting the position of the reel with respect to a reference system external to the reel, for example fixed with respect to the sensors. For example, a device for detecting the position of the reel of this type can be provided with an encoder system, associated with the movement of the second section 15B of the conveyor belt, so that the position of the reel that is fixed on this second section 15B is known.

In this example, the reels are analyzed arranged with a flat face resting on the conveyor 15. Analogously, the machine can also provide for the case of reels arranged on the conveyor with axis horizontal or almost horizontal, or inclined, i.e. resting thereon with their cylindrical side. The reels can be arranged with axis vertical or almost vertical, or inclined also in the magazine from which they are picked up.

An example of operation can be the following.

From the pick-up zone 12A of the magazine 12 the pick-up and moving device 30 carries a reel B onto the first section 15A of conveyor belt 15, with the reel B resting with a flat face thereof on this belt.

This reel B is fed according to the direction f3 conveyed by the first section 15A of conveyor belt to the intersection zone 15AB, where the chains of the first section are lowered causing the reel to be picked up by the second section 15B of conveyor belt, at a given support height of the reel on this second section.

This reel thus enters the evaluation zone of the evaluation apparatus of geometric parameters of the reel 14. In this zone, the first and the second distance sensors 21-22 are positioned so as to be close to the reel (acting on the regulations along X and Y by means of the devices 123, 223), once this passes through the evaluation zone. The first sensors 21' and 21" are positioned so as to be more or less at the center line of the flat face of the reel, while the second sensors are positioned to be more or less at half the height of the reel (knowing the geometric production parameters of the reels).

The optical distance measurement sensors 21-22 take a reading, for example, every millisecond, and therefore in practice perform a continuous sequence of distance readings along a direction parallel to the direction f4.

When the reel B intersects the reading axis of the first sensors 21 (arrow Y), these detect the reel. From that moment, knowing the forward movement of the second section of conveyor belt 15B by means of the related encoder 26, the horizontal distance between each vertical reading point of the sensors 21 is known.

Knowing the vertical distance between the two first sensors 21, the distance reading from the respective flat face of the reel of each first sensor makes it possible to know the axial width parameter of the reel along a chord, preferably a diametrical chord of the faces of the reel.

From the same reading it is possible to know the parameter relating to the length of the two diameters of the flat faces of the reel, and of the diameter of the core of the reel.

The distance of the first sensors from the respective flat faces makes it possible to verify, for example, the presence of any ridges, protruding plies, roughness of the flat faces, any conicity of the reel, and the like.

When the reel B intersects the reading axis (axis of the arrows X) of the second sensors 22, these detect the reel. From that moment, knowing the forward movement of the second section of conveyor belt 15B by means of the related encoder 26, the horizontal distance between each reading point of the second sensors 22 is known. These reading points on the sides of the reel in practice roughly form two arcs of circle.

Knowing the horizontal distance between the two second sensors 22, the distance reading from the respective semi-cylindrical side of the reel of each second sensor makes it possible to obtain, every millisecond, the length of the chord of the section of the reel at the height of the second sensors, including the diameter of the reel.

In addition to the diameter of the reel, the reading in general makes it possible to obtain information on the roundness, i.e., the cylindricity of the reel.

The distance information between the readings of the first sensors and of the second sensors, combined on the basis of the position of the reel, makes it possible to highlight other geometric parameters, for example an improved evaluation of the roundness of the reel, of any conicity, or the lack of coaxiality between reel and core, and the like.

When the reel B passes the evaluation zone, it reaches the handling zone by the second pick-up and moving device 30A, which carries the reel B to the stacking module 16, where the reels are stacked according to an axis, for example vertical, and carried to the packaging module 17 to be wrapped by a packaging film.

In this example, the conveyor belt 15 is formed by two sections orthogonal to each other, in which the evaluation zone is defined completely in the second section 15B.

Figure 7:
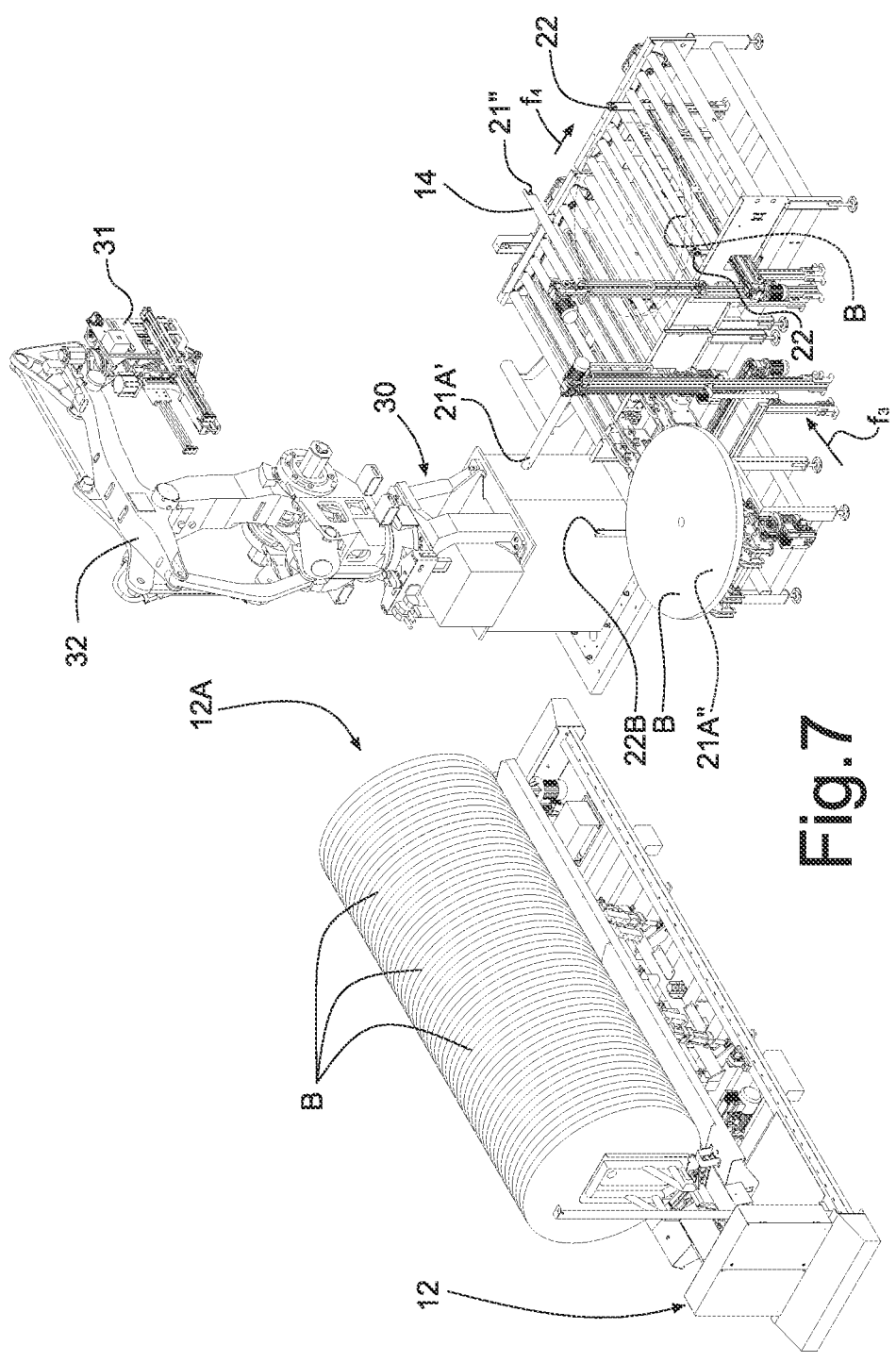
FIG. 7 represents a control machine according to the invention, in a variant with respect to FIGS. 5 and 6.

In another preferred embodiment, the evaluation zone of the reel by the evaluation apparatus 14 can be provided in both the sections 15A and 15B. For example, FIG. 7 shows the case in which both the first sensors 21', 21" and the second sensors 22 present in the second section 15B are replicated in the first section 15A (indicated with 21A'-21A" and 22B) of conveyor belt, so as to measure the reel according to orthogonal directions, increasing the degree of precision in the evaluation of the geometric parameters of the reel.

In other embodiments, first sensors 21 (or second sensors 22) can be present in the first section and second sensors 22 (or first sensors 21) can be present in the second section 15B.

In other embodiments, first and second section of conveyor belt can be inverted, i.e., the section that is the handling zone of the second pick-up and moving device becomes the zone for depositing the reel from the magazine, the second section of conveyor belt becomes the first part along which the reel travels, while the first section of conveyor belt becomes the second part along which the reel travels.

In other embodiments, the conveyor belt can be defined by a single rectilinear section on which the zone of arrival from the magazine by means of the first pick-up and moving device 30, and the evaluation zone, and the handling zone by the second pick-up and moving device 30A are defined. In this case, along this single rectilinear section only first sensors 21 or only second sensors 22 can be present, or both the first and the second sensors 21-22 (as in the case of FIG. 5, in which the rectilinear section can be considered as the second section 15B), can be present.

In the examples above the case of a sequence of single reels placed resting on the conveyor belt 15, and in which the evaluation apparatus evaluates each reel individually, in sequence, has been shown. The machine can also operate in the case in which a sequence of assemblies of reels (for example two or three) stacked coaxially on one another, in which the lower reel rests on the conveyor belt, arrive on the conveyor belt from the first part of plant 101. In this case, for example, the first lower sensor 21' evaluates the parameters associated with the lower face of the lower reel, while the first upper sensor 21" evaluates the geometric parameters associated with the upper face of the upper reel. The second sensors can evaluate the parameters linked to the cylindrical side of one of the two reels, while further second sensors can evaluate the parameters linked to the cylindrical side of the other reel.

There could be a plurality of conveyor belts 15 placed side by side, along which respective sequences of reels coming from the first part of the plant are moved, each provided with its own evaluation zone and pick-up zone. A single pick-up and moving device of reels (for example the industrial robot), which picks up and moves in a programmed manner from both conveyor belts, or a device for each conveyor belt can be present.

In the examples indicated above, cases in which the relative movement between reel and evaluation apparatus is of linear type, i.e., rectilinear, have been described. In other embodiments, the relative movement between evaluation apparatus and reel (or reels) being evaluated can be of rotary type. A simple example, which provides for a rotary table on which the at least one reel is arranged and which defines an evaluation zone of the reel, is described below. One or more distance measurement sensors are arranged around this rotary table. Once the reel is on the table, it is operated to carry out a rotation, i.e., to cause the reel to carry out a rotating (non linear) movement with respect to one or more sensors. Advantageously, a device for evaluating its angular position, for example an encoder system, can be associated with the table. For example, a distance sensor (preferably a pair, preferably arranged aligned on opposite sides of the rotary table) measures, for example, the distance from the cylindrical side of the reel being rotated, obtaining information on the circular shape of the reel. Naturally, the rotary system can be reversed, i.e., the at least one reel remains stopped in the evaluation zone and a frame carrying one or more distance sensors is rotated about an axis parallel to the axis of the reel, so that the sensors rotate around the cylindrical side of the reel.

The rotary table (or the rotary frame with the sensors) can be integrated, for example, inside the conveyor belt 15, so that the reel passes through evaluation zones of linear type and evaluation zones of rotating type. In other examples, this rotary table (or rotary frame rotating around an evaluation zone) can be alternative to the conveyor belt. For example, in the case of table integrated in the conveyor belt, the rotary table can be composed of a rotary frame on the which a series of rollers suitable for the passage of the reel are fixed.

Figures 8, 9:
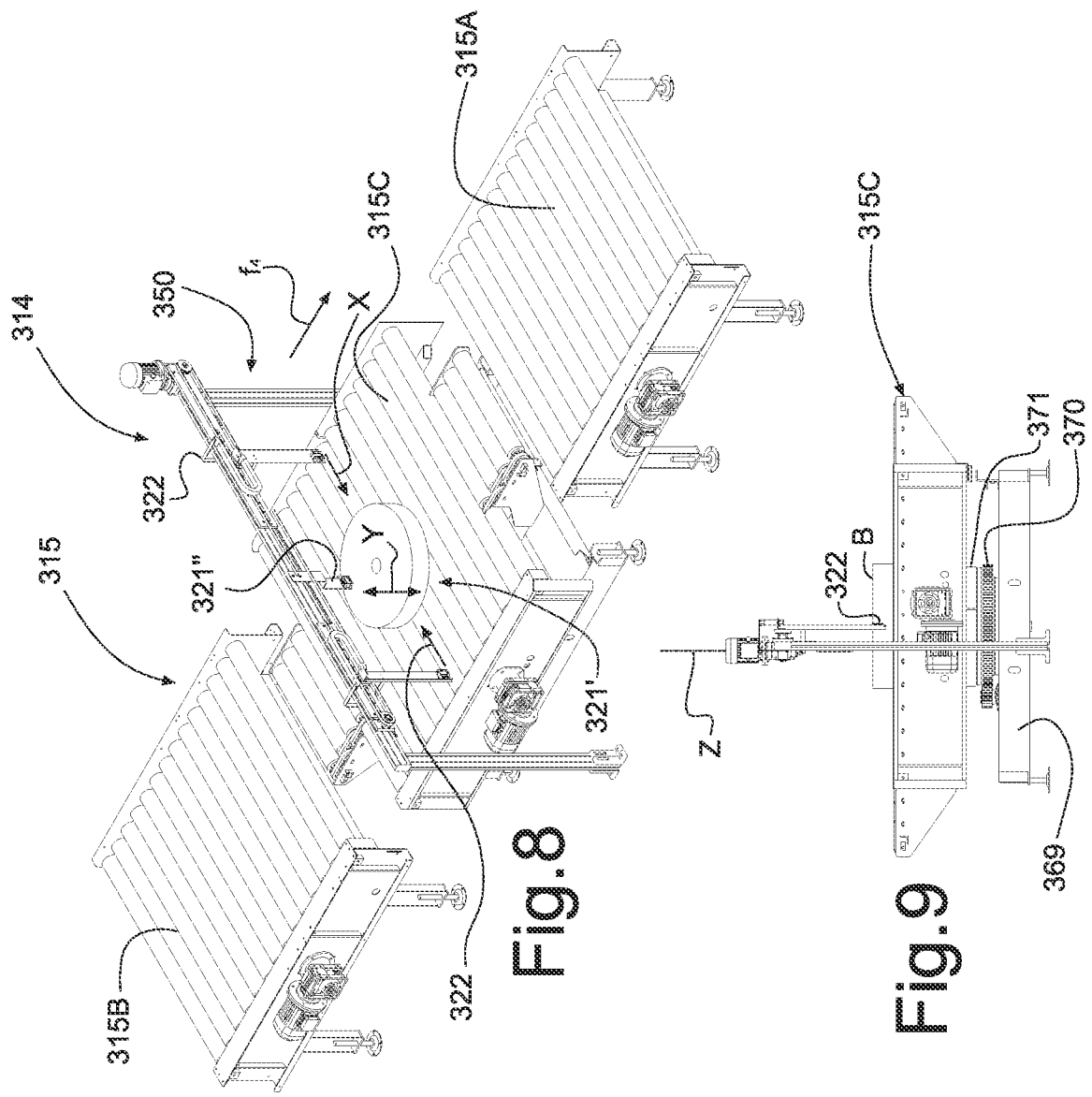
FIG. 8 represents a schematic axonometric view of an embodiment with conveyor belt in a variant with respect to the preceding figures.
FIG. 9 represents a lateral view of a portion of the conveyor belt of FIG. 8.

A similar example is shown, for example, in FIGS. 8 and 9. For example, a conveyor belt 315 replaces a belt 15 as in FIGS. 5 to 7. For example, this conveyor belt 315 is of roller type. Advantageously, the conveyor belt 315 is divided into at least two and, in this example, three parts. A reel B picked up from the pick-up zone 12A is placed on a first portion 315A of this belt.

On a second portion 315B of the belt 315, the reel is picked up, for example by the robot 32 (or other pick-up and moving device) to be carried to the unloading zone 13.

The first and the second portion 315A and 315B are separate from each other. A third intermediate portion 315C, which acts as rotary table, according to a vertical axis, is present between them. The evaluation zone for the reel, i.e., in which the evaluation apparatus 314 is present, is provided on this third portion 315C.

For example, analogously to what was described above, a distance measurement device comprises a pair of first distance sensors 321 (at least one is necessary), for example optical sensors or laser sensors adapted to measure the distance from an object according to a direction, placed over and under the supporting surface of the reel on the conveyor belt, i.e., over and under the support height of the reel on the conveyor belt. A first lower sensor 321' (not visible in the drawings) is placed under the support height of the reel on the third portion 315C of the conveyor belt, and a first upper sensor 321" is placed over the support height, and more in particular over the space that can be occupied by the reel.

The two first sensors 321 are advantageously maintained aligned in the measurement direction (for example a vertical direction Y).

The lower sensor 321' is fixed with respect to the ground and is freed from the third portion 315C. Analogously, the upper sensor 321" is fixed to a framework 350 fixed to the ground and is freed from the third portion 315C

Two second distance measurement sensors 322 (at least one is necessary) are fixed to the framework 350 and are arranged above the support height of the reel on the third portion 315C of the conveyor belt 515, and in lateral position with respect to the conveying direction f4 of the reel. These sensors 322 are preferably mutually aligned in the distance measurement direction X (for example horizontally) and facing, in operation, in lateral direction toward the center of the conveyor belt, i.e., the space that can be occupied by the reel.

The evaluation apparatus 314 further comprises, for at least one distance measurement sensor of each pair 321-322, preferably for both, a respective regulation device for regulating the position of the respective sensor in the evaluation zone of the reel, similarly to what was already described above, i.e., each regulation device allows the movement of the sensor along a regulation direction, for example by means of a guide system and movement actuator. Moreover, just as the case described above, this position regulation device of the sensor further comprises a further device for indicating the position of the distance sensor along the regulation direction, such as an encoder system, so that the position of the distance sensor with respect to a reference system is known. Advantageously, the regulation device is of automatic type, so that it is possible to move the distance sensor in an automated and spatially controlled manner.

In this example, the third portion 315C of the belt 315 can rotate about a vertical axis Z with respect to the ground, by means of a rotation system 370, for example through a rotation actuator interposed between a ground support frame 369 and the portion of belt. An evaluation device 371 of the angular position of the rotation system 370, for example an encoder system, is associated therewith. This third portion 315C is a rotary table.

The reel B passes from the first portion of belt 315A to the third portion of belt 315C. The reel passes through the field of action of the sensors 321 and 322 that detect the reel. The rotary table 315C is rotated through 360° (rotation starts, for example, when the first sensors 321 detect the core of the reel). Preferably, during rotation of the table 315, the reel is stopped with respect to the table, i.e., it does not move along the third portion 315. In other embodiments, the reel can move along the third portion 315 of the conveyor belt, as an encoder system can be present, which provides the position of the reel in the direction of feed along this portion of belt 315.

The information given by the first and second sensors 321 and 322 is substantially analogous to that already described in the examples of the previous figures.

In another example, not shown in the figures, the evaluation zone of a reel can be provided along the moving path of the reel from the pick-up zone to the unloading zone, and in this evaluation zone (for example the reel is carried onto an evaluation platform) the reel is stopped and a robot (or other device) carrying at least one (or more) distance measurement device(s) is configured to move the distance measurement device around the reel, in order to evaluate suitable geometric parameters of the reel. The position of the distance measurement device is known, as the position and the orientation of the wrist of the robot is known.

Figure 12:
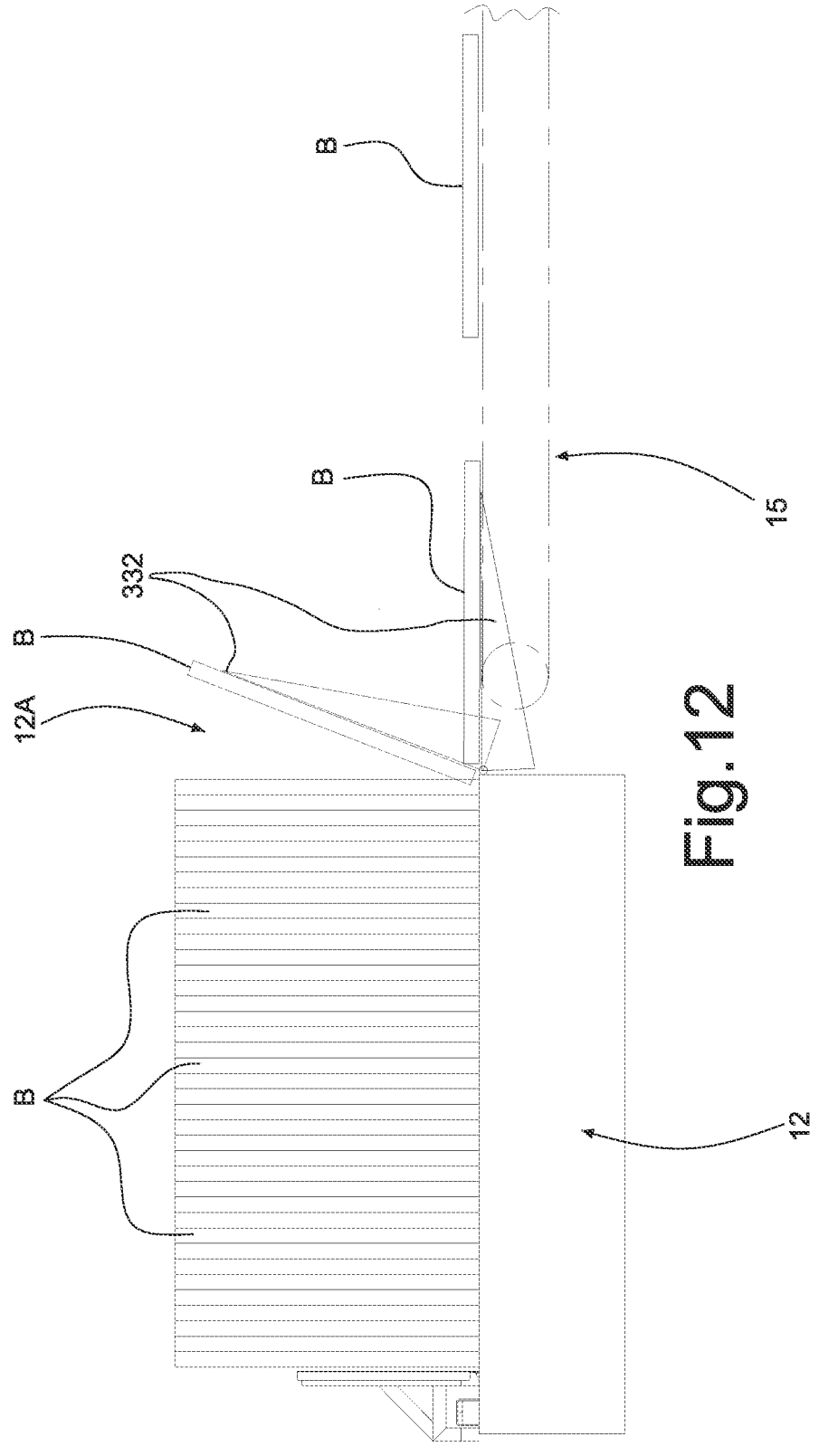
FIG. 12 represents a lateral schematic view of a portion of machine according to the invention, in a variant with respect to the examples of FIGS. 5 to 9, showing a tilter that acts as pick-up and moving device for one or more reels from a pick-up zone to a conveyor.

FIG. 12 shows a variant of pick-up and moving device of one or more reels from the pick-up zone to the conveyor. In the previous examples an anthropomorphous robot 32 was shown by way of example. Naturally, any other machine capable of picking up one or more reels from the pick-up zone and placing them on a conveyor or other part of the plant with the same functional purposes can be used. In particular, the example of FIG. 12 shows a tilter 332 articulated in the vicinity of the pick-up zone 12A (this latter, for example, similar to the one of the magazines of the cases previously illustrated), configured to tilt from a position for receiving the first reel of the sequence of reels present on the magazine, i.e., the reel in the zone 12A, to a position for releasing the reel on a conveyor belt 15, where an evaluation apparatus of the reels as in the examples of FIGS. 5 to 9 can be present.

Figure 10:
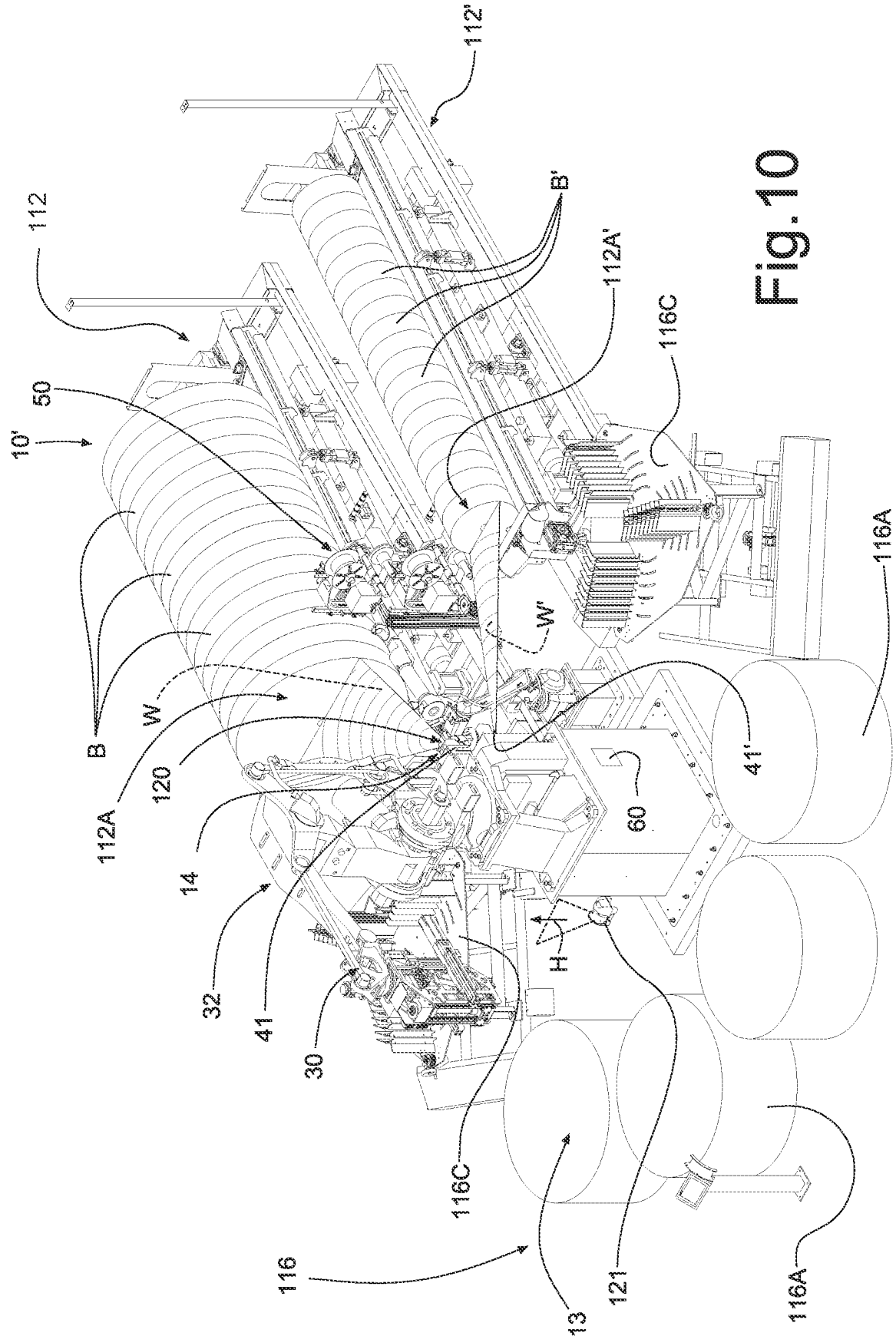
FIG. 10 represents a control machine according to the invention, in a variant with respect to FIGS. 5 and 7.

FIG. 10 shows a machine 10' according to the invention, in a variant with respect to the cases of the previous examples.

In this case, the control machine 10' comprises, for example, two magazines 112 and 112' of two sequences of reels B and B' of different diameters, coming from the first part of plant 101, at the head of which the respective pick-up zones 112A-112A' for the pick-up and moving device of reels (for example the industrial robot 32) are defined.

For example, these magazines 112 and 112' are analogous to those described in the previous example and therefore are formed by a conveyor belt, for example with rollers, provided with a structure configured to receive the reels B so that they have a respective flat face B1 or B2 facing a direction of movement of the reel. In practice, these reels can have their reel axis parallel to the direction of feed (for example inclined from bottom to top).

For example, this structure of the magazine 112-112' can be a concave structure, for example a V-shaped structure, with concavity facing upward.

The case of a single magazine 112 is described below. The reels B coming directly from the winding station 104, i.e., an assembly of coaxial reels with adjacent flat faces in mutual contact, for example by means of the conveying system 109, are arranged thereon.

The end part, i.e., the head, of the magazine 112 defines the pick-up zone 112A for the pick-up and moving device 30 (preferably the industrial robot 32). In this example, this pick-up zone coincides with the evaluation zone of the reel B. Naturally, just as for the example described above, this magazine can also be "static", i.e., the reels deposited therein are stopped and are not moved toward the pick-up zone. In this case, the reels are picked up, one at a time, by the robot, from the same position in which they were deposited by the shifting system 109. This device always picks up the first reel of the row, up to the last, in a new pick-up zone that coincides with the position of the reel that is time by time at the head of the row, and which in this case also coincides with the evaluation zone of the geometric parameters of the reel.

In fact, in this case, the evaluation apparatus 14 can be provided with a distance measurement device 120 arranged externally to the magazine 112 and oriented to measure parts of the flat face B1-B2 of the reel arranged in the pick-up zone 112A.

The distance measurement device 120 comprises, for example, a laser scanner 41 adapted to execute 2D or 3D scans (marked by the dashed line in FIG. 10, and indicated with W) of part or of all of the flat face of the reel arranged in the pick-up zone 112A. From the 2D or 3D scan it is possible, by means of an electronic program, to measure the distances between the parts of reel that are required to evaluate the geometric parameters of interest.

In practice, this scan makes it possible to obtain geometric parameters associated with the flat face of the reel, such as diameter, core diameter, misalignment of the core with respect to the reel, any ridges or plies protruding from the face, roughness, etc.

An optional further distance measurement device 120, for example the same laser scanner (not indicated in the figures), can be arranged and oriented so as to evaluate the width of the reel arranged in the pick-up zone 112A.

Alternatively, a further distance measurement device 120, for example a similar laser scanner 121, can be present, oriented toward a specific zone of the moving path of the reel B from the pick-up zone 112A to the unloading zone 13 on a platform 116A of a stacking module 116. For example, this laser scanner is directed from bottom to top according to the arrow H and the robot 32 that moves the reel passes the face of the reel B not evaluated previously (as in "shadow" during the previous scan) over the scanning beam (indicated by the arrow H). In this case, this specific zone of the moving path toward which the distance measurement device is oriented is a separate zone to the pick-up zone.

Magazines 116C for cardboard discs to place between the stacked reels, manipulated, for example, by the same robot 32, are also present in the packaging zone.

As mentioned, FIG. 10 shows a plurality of (two in the example) magazines 115 and 115' placed side by side, along which respective sequences of reels coming from the first parts of the plant are moved, each provided with its own evaluation zone and pick-up zone. In this case, there can be a single pick-up and moving device of reels (for example the industrial robot 32) programmed to pick up and move from both conveyor belts, or there can be a device for each conveyor belt. Preferably, there are separate scanners 41 and 41' for each conveyor belt.

Optional labeling modules 50 arranged on the side of the conveyor belts 115, adapted to apply identification labels to the reels, can also be present.

In place of a laser scanner, the distance measurement device 120-121 can comprise a video camera that, by means of a recognition program, is able to recognize the shape of the parts of the reel to be evaluated. It is therefore possible, by means of an electronic program, to measure the distances between the parts of reel required for evaluating the geometric parameters of interest. In practice, the video camera makes it possible to obtain geometric parameters associated with the flat face of the reel (or the other parts viewed), such as diameter, core diameter, misalignment of the core with respect to the reel, any ridges or plies protruding from the face, roughness, etc.

Moreover, as well as making it possible to obtain parameters linked directly to the distance of parts of the reels, a video camera is able to detect, by means of analysis of a suitable electronic program associated with the video camera, also visual anomalies of the reel, such as dirty marks, contaminations by foreign material, etc.

Further, a distance measurement device 120-121 can comprise an image projector, adapted to project images on the flat face of the reel B, such as the images of one or more lines, for example at a diametrical zone of the flat face of the reel facing the pick-up zone (or in another zone of the moving path from this pick-up zone to the unloading zone). A video camera views the line (or the lines) on the reel and an electronic program interprets the shape of the line to calculate its length, calculate the depth of the grooves and peaks of wavy trends, the dimensions and positions of discontinuities, etc. in order to calculate the geometric parameters of interest.

It is clear that the machine 10 can provide a combination of distance measurement devices 120, 121 such as those described. This combination can also provide the distance sensors 21, 22 described in the first examples. Analogously, in the first examples, laser scanners 121, video cameras, projectors and video cameras, as described above, can be used in place of the sensors 21, 22.

It is clear that the distance measurements, of contactless type, evaluated by the sensors described above, can also be of the type with contact, for example by means of mechanical feelers.

In these last examples, the reels are analyzed arranged with the cylindrical side resting on a support of the magazine. Analogously, the machine can also provide for the case of reels arranged on the magazine with vertical or almost vertical, or inclined, axis, i.e., resting with the flat face on the magazine.

As mentioned, the pick-up and moving device 30 is advantageously provided with a gripping and supporting apparatus 31 for a reel B, which can be associated with the manipulator of the industrial robot 32, or with another moving machine.

Advantageously, in preferred embodiments, the gripping and supporting apparatus 31 can be provided with at least part of the evaluation apparatus of geometric parameters of reels, which allows the evaluation of the parameters of the reel being held. For example, one or more of the distance measurement devices 21, 22, 121 described above, optionally in combination with one another, can be present on this gripping apparatus 31.

This possibility can be provided both in the case of association with an aforesaid first pick-up and moving device 30 and in the case of association with an aforesaid second pick-up and moving device 30A, with reference to the examples of FIGS. 1A, 5, 6 and 7, as well as in the case described above, i.e., with pick-up and moving device that picks up the reel directly from the magazine to take it to the unloading zone (case in FIG. 10).

In this way, the evaluation of geometric parameters of the reel can take place entirely, or in part, during the step of picking up the reel by this gripping and supporting apparatus.

Figure 11:
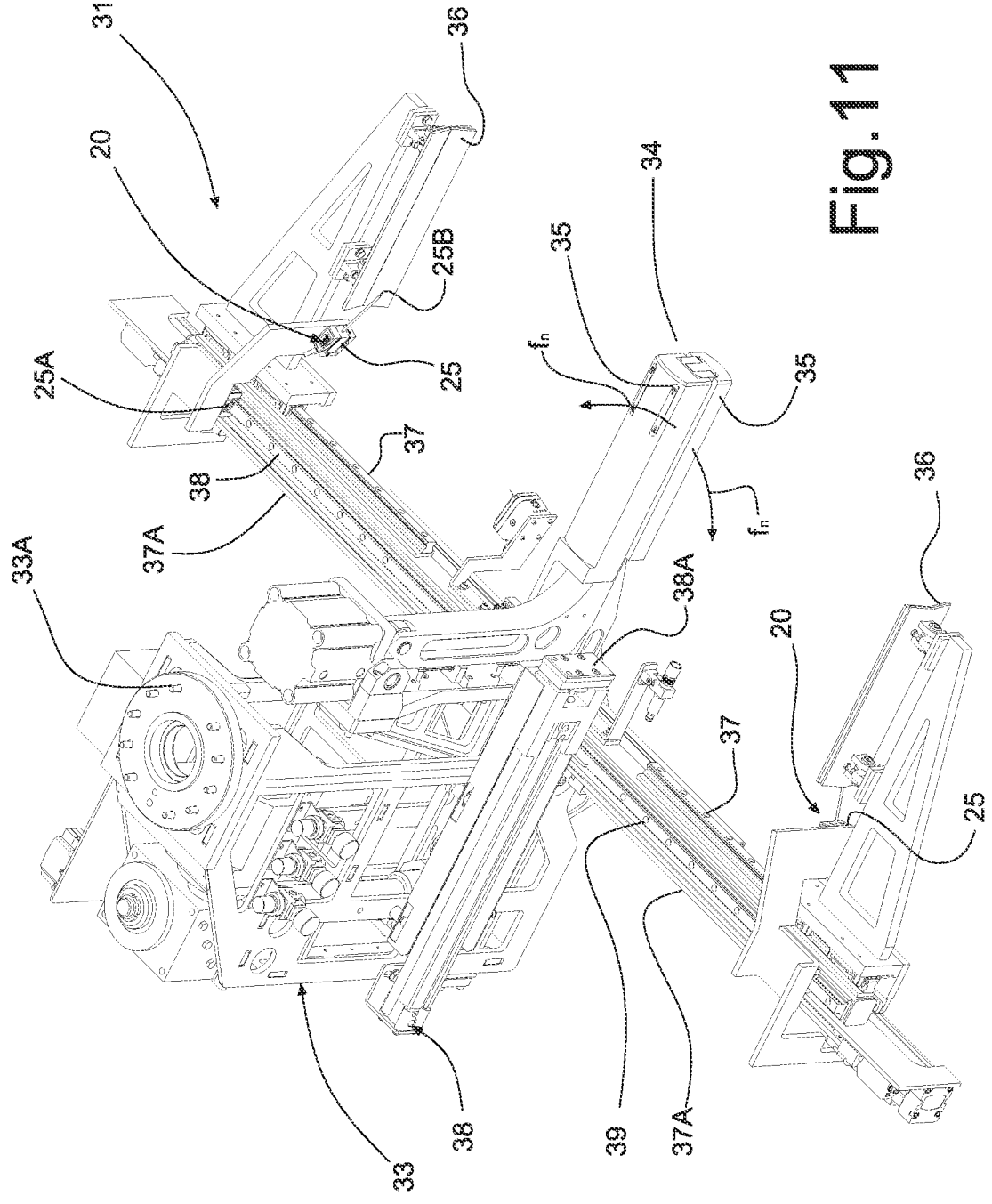
FIG. 11 represents a schematic axonometric view of a gripping and supporting apparatus for a reel, to be used in a control machine according to the invention.

FIG. 11 shows in detail a possible embodiment of a gripping and supporting apparatus 31.

This gripping and supporting apparatus 31 comprises, for example, a main structure 33, provided with a joint 33A for connection to the manipulator of the robot 32. A central hub 34, of expandable type, extends from this main structure 33, adapted to be inserted into the core of a reel in a first non expanded configuration and to expand in a second configuration to remain blocked on the inner walls of the core. For example, this hub is formed, for example, of two jaws 35 adapted to be inserted into the core of a reel in a first compact configuration and to be spread apart according to the arrows fn with respect to each other to be blocked on the inner walls of the core of the reel. The relative movement of expansion of the grippers is, for example, given by the combination of a kinematic mechanism and of a movement actuator, such as a pneumatic cylinder.

The gripping and supporting apparatus 31 also comprises two lateral retaining side walls 36, which protrude from opposite sides of the main structure, for example provided with a concave structure with concavity facing the hub 34 in order to press on opposite sides of the cylindrical side of the reel. These side walls 36 are mounted sliding on respective transverse guides (for example orthogonal to the extension of the hub, i.e., to the axis of a reel when the hub is inserted into the core of the reel) which allow sliding thereof, by means of movement actuators (such as pneumatic cylinders). For example, the transverse guides 37 are provided on transverse arms 37A that project in a cantilever fashion, on opposite sides, from the main structure 33.

The gripping and supporting apparatus 31 further comprises a pusher 38, which, for example, comprises a pusher head 38A adapted to act against a flat face of the reel, and to push the reel in the direction of removal from the hub 34. For example, the pusher head is mounted on a movement actuator (such as a pneumatic cylinder) fixed to the main structure 33 and adapted to act, for example, in a direction more or less parallel to the extension of the hub, i.e., to the axis of a reel when the hub is inserted into in the core of the reel. This pusher 38 can push the reel along the hub, so that it exits from the core, decoupling the reel from the gripping apparatus. Moreover, the pusher can compact several reels present on the hub, so that the contiguous faces of the reels are in contact with one another.

As mentioned, in some embodiments, the gripping and supporting apparatus 31 can be provided with at least part of the evaluation apparatus of geometric parameters of reels. In the example described above, distance measurement devices 20 in the form of third distance sensors 25 are present, for example optical sensors or laser sensors of the type described above and indicated with the numbers 21 and 22.

More in particular, in this example, for each arm 37A, a third distance sensor 25 is present, mounted on a carriage 25A movable along a track 39 produced, for example, along the respective arm 37A, according to a direction parallel to a respective transverse guide 37, i.e., a direction orthogonal to the axis of a reel when the hub is inserted into the core of the reel. A movement actuator, for example a pneumatic cylinder, allows the controlled movement of the third sensor 25. A system for detecting the position of the sensor along the track, for example an encoder system, is associated with the actuator/third sensor. This third sensor thus makes it possible, in practice, to evaluate the radius of the reel, the radius of the core, any ridges, protruding plies and roughness associated with the flat face of the reel toward which the third sensor 25 is facing (the reading direction is indicated by the sign 25B). These geometric parameters of the reel can be read during its movement from the pick-up zone 12A to the unloading zone. It should be noted that a reference system of the position of the pusher head 38A in the direction of movement/extraction, such as an encoder system (not indicated in the figures), is associated with the pusher 38, so that the position of the head 38A along said direction of movement/extraction, i.e., the position of the face of the reel along this direction, i.e., along the hub 34, is known. In practice, the pusher operates as a mechanical feeler to inform the system of the exact position of the reel.

In general, the second part of plant 110 comprises an electronic control center 60 of the plant 100 provided with a database in which the tolerance ranges for one or more geometric parameters detected by the control machine 10 are stored, so that when a geometric parameter is detected outside a respective tolerance range, one or more of the following operations are performed:

the reel on which the geometric parameter outside a respective tolerance range was detected is moved toward a zone for positioning non-conforming reels, or rejecting the reel, the reel on which the geometric parameter outside a respective tolerance range was detected is labeled as non-conforming, feedback is sent to the first part of the plant in order to modify the process parameter/feature or parameters/features that cause deviation of the geometric parameter of the reel from said tolerance range.

Therefore, the information regarding the surface and dimensional quality of the reels, acquired by means of the control machine 10, can be used to optimize management of the reel selection system. In fact, if, during the packaging step, the machine 10 detects that a certain reel does not comply with the production tolerances, the reel can be classified based on the severity of the defect. The control machine can inform the reel movement system which instead of sending the reel to the stack to which it should be sent, sends it to a zone allocated to reels of inferior quality or to reels that require to be reworked, or to rejected reels, according to the severity of the defect.

Analogously, also the reel labeling module can receive information from the control machine 10, and print a summary of this information on the labels. If the control machine 10 detects a defect in a certain reel, the labels attached to this reel can provide information on the non-conformity.

In the plant 100, during the cutting-rewinding step, the web of product is cut into strips to form reels of the desired width. As is known, due to the tension to which the web is subjected during this process and to the mechanical properties of the belt, the, width of the strips that are obtained from the cutting process is not the same as the distance between the cutting edges of the blades that cut the web into strips. The aim of the positioning process of the cutting blades is to obtain reels of the width complying with the production specifications.

The control machine, by detecting geometric parameters linked to the axial width of the reels, can provide information for correction of the distance of the blades to form reels of the desired width. In some cases, the blades are positioned by means of an automatic system, in other cases they are positioned manually by the operator. In both cases, the control machine can provide information that allows setting of the blades so as to obtain reels of the desired width. In one case, that information is transmitted automatically via software, while in the other case the information is communicated in tables to the operator, who will then modify the positions of the blades manually.

Analogous considerations to those indicated above also apply to axial cutting and positioning of the cardboard cores along the winding axis of the rewinder. According to market requirements, the cardboard cores must not protrude beyond the flat surface of the reel, nor must they be too short with respect to the width of the reel. In some cases the axial cutting and positioning operations are carried out by means of automatic systems, while in others this operation is carried out manually by the operators. The control machine is capable of reading the effective width of the reel, the effective width of the cardboard core, and the relative position between these two bodies. Based on the information collected by the control machine, the length of the cut of the cardboard cores and their positioning on the winding shaft can be corrected. It can thus provide accurate information to obtain a high correspondence between the edge of the cores and the flat faces of the reels.

If a cutting assembly, (in longitudinal direction) of the winding machine has a blade that is becoming blunt, usually the final surface of the reel is irregular, i.e., for example has partially protruding edges. The control machine according to the invention can control this anomaly and inform the machine operator of the need to perform maintenance on the cutting tools.

The web of product being wound, in the case of nonwoven, is a material characterized by a high Poisson's ratio value. This means that if a strip of nonwoven is subjected to a variable tension during winding the width of the strip varies greatly. The result is that the flat surface of the reel is not perfectly planar, but is influenced by the variation of width of the reel. In particular, during the rewinding cycle three winding phases can be identified: acceleration, constant speed, deceleration. Due to the inertia of all the rotating members of the machine, the tension of the various strips can vary according to the various winding phases. If these variations in tension occur, the three zones listed above are clearly identifiable on the flat face. Otherwise: the strip wound in the three operating phases of the rewinder has a different width from phase to phase. If the analysis system of the flat face of the reels detects any non planarity caused by a variation of tension of the strips, the system can correct the operating parameters of the winding machine (belt tension, differential speed of a roller with respect to the preceding one) so as to have a surface of the finished reel with greater planarity and a strip with a width within the required tolerances.

Some types of nonwovens are characterized by a high Poisson's ratio between the transverse strain of the web and the strain in the direction of thickness of the web (in practice, when the sheet is compressed it tends to broaden). In a reel, the various turns exert a radial pressure on the innermost turns, and this causes the radial pressure on the webs that form the various turns to be greater on the inner turns with respect to the outermost turns. If the web is characterized by a high Poisson's ratio value, the shape of the reel will be deformed. This defectiveness can be corrected by varying various operating parameters of the winding machine during winding. The parameters that most influence this aspect are: the winding tension and the force that the rider roller exerts against the reel. Benefits are obtained in terms of planarity of the reels by reducing these values as the diameter of the reel increases.

All these feedback activities, based on the information acquired by the control machine according to the invention, contribute to correct setting of the parameters of the rewinder, and can be managed by artificial intelligence algorithms, for example of "machine learning" type.

It is understood that the above only represents possible non-limiting embodiments of the invention, which can vary in forms and arrangements without departing from the concept on which the invention is based. Any reference numbers in the appended claims are provided purely to facilitate the reading thereof in the light of the description above and of the accompanying drawings and do not in any way limit the scope of protection of the claims.

The invention claimed is:

1. A machine for controlling the shape of a reel of web product, the machine comprising:

at least one pick-up zone for at least one reel to be evaluated;

a moving apparatus for moving said at least one reel along a moving path from said pick-up zone toward an unloading zone; and an evaluation apparatus for evaluating one or more geometric parameters of the reel, said evaluation apparatus being configured to act in at least one evaluation zone provided at least in part along said moving path of the reel, wherein said evaluation apparatus comprises at least one distance measurement sensor, wherein during a relative movement of the reel with respect to the distance measurement sensor, said distance measurement sensor is adapted to read the respective distance from the reel, wherein said evaluation apparatus further comprises a device for detecting the position of the reel, in the direction of relative movement, with respect to said distance sensor, so that for each distance reading carried out by a distance sensor the relative position of the reel in said direction of movement is also known, and therefore the combination of the distance information acquired by the distance measurement sensor from the reel and of the information relating to the position of the reel in the direction of movement allows information on the geometry of the reel to be obtained, wherein said machine comprises a regulation device for regulating the position of said at least one measurement distance sensor in the evaluation zone of the reel, said regulation device comprising at least one regulation direction of the position of the sensor, wherein said position regulation device further comprises a further device for indicating the position of the distance measurement sensor along said regulation direction.

2. The machine according to claim 1, wherein said evaluation apparatus comprises one or more of the following distance measurement devices adapted to measure the distance of one or more parts of the reel with respect to other parts of the reel or with respect to one or more reference surfaces external to the reel: optical sensors, laser sensors, laser scanning devices, ultrasonic devices, video cameras, mechanical feelers, and possible combinations of devices of said list, said distance measurement devices being associated with electronic processing programs of the signals detected in order to translate them into geometric parameters of the reel.

3. The machine according to claim 1, wherein said moving apparatus comprises at least one pick-up and moving device, adapted to pick up at least one reel from a zone of said moving path and to move it along at least part of said moving path.

4. The machine according to claim 3, wherein said pick-up and moving device comprises at least part of said evaluation apparatus for evaluating at least one geometric parameter of the reel during pick up and moving.

5. The machine according to claim 1, wherein said moving apparatus comprises at least one conveyor of reels arranged at least in a row in the conveying direction and wherein along the path defined by the conveyor said evaluation zone of said geometric parameters by said evaluation apparatus is provided.

6. The machine according to claim 3, wherein at least one said pick-up and moving device is present, acting between said pick-up zone and said at least one reel conveyor, adapted to pick up at least one said reel from said pick-up zone and to move it on said conveyor.

7. The machine according to claim 3, wherein at least one said pick-up and moving device is present, arranged between said at least one conveyor and said unloading zone, adapted to pick up at least one said reel from said conveyor, after it has been evaluated by said evaluation apparatus, and to move it toward said unloading zone.

8. The machine according to claim 1, wherein, in said evaluation zone, during the step of detecting the geometric parameters, a relative moving system is present between said reel being evaluated and at least part of said evaluation apparatus.

9. The machine according to claim 8, wherein said relative moving system is provided with a device for detecting the position of the reel with respect to said at least part of evaluation apparatus.

10. The machine according to claim 1, wherein said machine provides for one or more of the following:

said at least one distance sensor is an optical sensor or a laser sensor, said distance measurement sensor is adapted to read said respective distance from the reel in a continuous reading sequence.

11. The machine according to claim 1, wherein said machine provides for one or more of the following:

said at least one regulation direction of the position of the sensor is parallel to the reading direction of the distance of the sensor from the reel;

said regulation device is of automatic type.

12. The machine according to claim 5, wherein said reel conveyor defines a support height for the reels, and wherein one or more of the following distance sensors are provided along the conveying direction:

at least a first distance sensor located below, or above, said height and placed under, or over, the space that can be occupied by the reel being evaluated and facing upward, or downward, in operation, wherein two said first sensors being present, one arranged below said height and one arranged above said height, and mutually aligned in the distance measurement direction, at least a second distance sensor located above said height and in a lateral position with respect to the conveying direction of the reel and facing, in operation, a lateral direction toward the space that can be occupied by the reel, at least two second sensors being present, placed in opposite lateral positions with respect to the conveying direction, mutually aligned in the distance measurement direction.

13. The machine according to claim 1, wherein at least one magazine of reels arranged at least in a row is present, on which said pick-up zone is defined, and wherein a pick-up and moving device is adapted to pick up at least one reel from said pick-up zone on the magazine and to move it on a conveyor on which said parameter evaluation apparatus acts; wherein a further pick-up and moving device is configured to pick up said at least one reel from said conveyor after at least part of the evaluation has taken place and to move it to the unloading zone.

14. The machine according to claim 1, wherein said evaluation apparatus comprises at least one distance measurement device adapted to measure the distance of one or more parts of the reel with respect to other parts of the reel or with respect to one or more reference surfaces external to the reel and configured to act in the moving path managed by said at least one pick-up and moving device.

15. The machine according to claim 1, which comprises at least one magazine of reels arranged at least in a row, on which said pick-up zone is defined, and a pick-up and moving device configured to pick up at least one reel from said pick-up zone of the magazine and to carry it to an unloading zone, and wherein said evaluation apparatus comprises at least one distance measurement device oriented to measure parts of the flat face of the reel arranged in said pick-up zone of the magazine; wherein said at least one distance measurement device being external to said at least one pick-up and moving device.

16. The machine according to claim 14, wherein at least one said distance measurement device is oriented to measure parts of said reel, wherein parts relative to the flat face and/or to the sides, arranged in said pick-up zone; wherein said at least one distance measurement device being external to said at least one pick-up and moving device.

17. The machine according to claim 1, wherein at least one said distance measurement device is arranged externally to said pick-up and moving device and is oriented toward a specific zone of the moving path of said at least one reel from said pick-up zone to said unloading zone, distinct from said pick-up zone, in order to measure the distance of parts of said reel during movement by said pick-up and moving device.

18. The machine according to claim 1, wherein said at least one distance measurement device comprises a laser scanner adapted to scan part of the reel, wherein the side or a flat face, all or in part, or a video camera, associated with an electronic image processing program, or an image projector, adapted to project images on said part of reel, in combination with a video camera associated with an electronic program adapted to interpret the images projected on said part of reel, in order to reconstruct one or more geometric parameters of said reel.

19. The machine according to claim 1, wherein said pick-up and moving device comprises a robot provided with a manipulator associated with a gripping and supporting apparatus for at least one reel, or a tilter adapted to rotate a reel from the pick-up zone to a conveyor.

20. The machine according to claim 19, wherein said gripping and supporting apparatus for at least one reel is in turn provided with at least part of said evaluation apparatus of geometric parameters of the reel being held.

21. The machine according to claim 1, which comprises at least one reel magazine, provided with one or more of the following features:

in said magazine said reels are arranged at least in a row, on which said pick-up zone is defined;

said magazine is configured to move the reels along its extension, toward the pick-up zone, preferably being formed by a moving belt on which the reels are supported;

said magazine is configured to receive the reels and wait, with the reels stopped, for the reels to be picked up by a pick-up and moving device and wherein the pick-up zone is defined for each reel by the position it occupies in the magazine;

said magazine has a structure for receiving the reels such that the reels are supported in the magazine resting with a cylindrical side on a supporting surface, i.e., with the axes of the reels horizontal or slightly inclined with respect to the horizontal, i.e., not vertical;

said magazine has a structure for receiving the reels such that the reels are supported in the magazine with the axis of the reels arranged vertically or almost vertically, i.e., wherein at least some of said reels are supported in the magazine with a flat face resting on a supporting surface.

22. The machine according to claim 1, wherein said pick-up zone has a structure for receiving the reels configured to receive the reels so that the first reel that must be picked up in said pick-up zone has a face facing the pick-up and moving apparatus and the opposite face facing the face of an adjacent reel.

23. The machine according to claim 1, wherein said gripping and supporting apparatus for at least one reel comprises a hub configured to be inserted into the core of said at least one reel and a distance sensor adapted to be moved along a direction transverse to the axis of a reel when the hub is inserted into the core of the reel.

24. The machine according to claim 1, wherein said gripping and supporting apparatus for at least one reel comprises a hub configured to be inserted into the core of said at least one reel, and a pusher, provided with a pusher head adapted to act against a flat face of the reel, and to push the reel in the direction of removal from said hub; wherein said pusher is associated with a reference system of the position of the pusher head in the direction of movement/extraction, for example an encoder system, so that the position of said head along said direction of movement/extraction, i.e., the position of the face of the reel along said direction, i.e., on said hub, is known.

25. The machine according to claim 1, wherein said evaluation apparatus is adapted to evaluate one or more of the following geometric parameters of the reels: outer diameter of the reel, at least one axial width of the reel, roundness of the reel, diameter of any inner core of the reel on which said web product is wound, protrusion of any core from one or both faces of the reel, absence of flatness of the two faces of the reel, any plies of product protruding from the faces of the reel, any ridges of web product present on the faces of the reels, center of any cardboard core not coincident with the center of the outer circumference of the reel, variation of the thickness of the reel as a function of the radius of the reel, visual defects of the reels.

26. The machine according to claim 1, wherein an evaluation zone of at least one reel is provided along said moving path of the reel, and wherein in said evaluation zone the reel is stopped and wherein, in said evaluation zone, a robot carrying at least one distance measurement device is adapted to move said at least one distance measurement device around a reel in order to evaluate at least one said geometric parameter of said reel.

27. A plant for producing reels of web product comprising a machine for controlling the shape of a reel of web product according to claim 1, said plant further comprising:

a first part for producing an assembly of reels of thin product arranged coaxially mutually adjacent, wherein two adjacent reels have respective flat faces in mutual contact; and a second part for packaging the reels produced in said first part, wherein said machine for controlling the shape of a reel of web product is arranged between said first part and said second part.

28. The plant according to claim 27, comprising a shifting system of the assembly of coaxial and adjacent reels exiting from said first part, configured to shift said assembly of coaxial and adjacent reels from said first part to said pick-up zone, this latter being configured to receive the adjacent reels so that they have a respective flat face facing a direction for gripping the reel.

29. The plant according to claim 27, wherein said second part of the plant comprises a stacking module arranged operatively downstream of said control machine, wherein said reels are stacked coaxially according to a horizontal or vertical axis; a wrapping module of the stacked reels with packaging film.

30. The plant according to claim 27 comprising a labeling module of the reels, so that said reels exiting from said control machine are labeled and subsequently carried to said stacking module.

31. The plant according to claim 27, comprising an electronic control center of the plant provided with a database of tolerance ranges for one or more geometric parameters detected by said control machine, so that at for least one geometric parameter detected outside a respective tolerance range, one or more of the following operations is carried out:

moving the reel on which said at least one geometric parameter outside a respective tolerance range was detected toward a zone for positioning non-conforming reels, or rejecting the reel, labeling the reel on which said at least one geometric parameter outside a respective tolerance range was detected as non-conforming, modifying the process parameter or parameters that cause deviation of the parameter from said range.

\* \* \* \* \*